United States Patent
Lee et al.

(10) Patent No.: US 12,443,829 B2
(45) Date of Patent: Oct. 14, 2025

(54) NEURAL NETWORK PROCESSING METHOD AND APPARATUS BASED ON NESTED BIT REPRESENTATION

(71) Applicant: SAMSUNG ELECTRONICS CO., LTD., Suwon-si (KR)

(72) Inventors: Seohyung Lee, Seoul (KR); Youngjun Kwak, Seoul (KR); Jinwoo Son, Seoul (KR); Changyong Son, Anyang-si (KR); Sangil Jung, Suwon-si (KR); Chang Kyu Choi, Seongnam-si (KR); Jaejoon Han, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 784 days.

(21) Appl. No.: 16/537,752

(22) Filed: Aug. 12, 2019

(65) Prior Publication Data
US 2020/0202199 A1 Jun. 25, 2020

(30) Foreign Application Priority Data
Dec. 19, 2018 (KR) .......................... 10-2018-0165585

(51) Int. Cl.
G06N 3/063 (2023.01)
G06N 3/045 (2023.01)
G06N 3/08 (2023.01)

(52) U.S. Cl.
CPC ............ *G06N 3/063* (2013.01); *G06N 3/045* (2023.01); *G06N 3/08* (2013.01)

(58) Field of Classification Search
CPC ........... G06N 3/084; G06N 3/00; G06N 5/00; G06N 7/00; G06N 10/00; G06N 20/00; G06N 99/00
See application file for complete search history.

(56) References Cited

U.S. PATENT DOCUMENTS 9,699,484 B2 7/2017 Su et al.
11,423,311 B2 8/2022 Brothers et al.
(Continued)

FOREIGN PATENT DOCUMENTS

CN 107451659 A 12/2017
KR 10-2004-0015613 A 2/2004
(Continued)

OTHER PUBLICATIONS

Micikevicius, P., Narang, S., Alben, J., Diamos, G., Elsen, E., Garcia, D., Ginsburg, B., Houston, M., Kuchaiev, O., Venkatesh, G., & Wu, H.. (2017). Mixed Precision Training. (Year: 2017).*
(Continued)

*Primary Examiner* — Kakali Chaki
*Assistant Examiner* — Johnathan R Germick
(74) *Attorney, Agent, or Firm* — NSIP Law

(57) ABSTRACT

A neural network processing method and apparatus based on nested bit representation is provided. The processing method includes obtaining first weights for a first layer of a source model of a first layer of a neural network, determining a bit-width for the first layer of the neural network, obtaining second weights for the first layer of the neural network by extracting at least one bit corresponding to the determined bit-width from each of the first weights for the first layer of a source model corresponding to the first layer of the neural network, and processing input data of the first layer of the neural network by executing the first layer of the neural network based on the obtained second weights.

9 Claims, 20 Drawing Sheets

(56) References Cited

U.S. PATENT DOCUMENTS

| | | | |
|---|---|---|---|
| 2016/0328647 | A1 | 11/2016 | Lin et al. |
| 2017/0270408 | A1 | 9/2017 | Shi et al. |
| 2018/0032866 | A1 | 2/2018 | Son et al. |
| 2019/0251436 | A1 | 8/2019 | Son et al. |

FOREIGN PATENT DOCUMENTS

| | | |
|---|---|---|
| KR | 10-2016-0140394 A | 12/2016 |
| KR | 10-2016-0143548 A | 12/2016 |
| KR | 10-2018-0052990 A | 5/2018 |
| KR | 10-2018-0077533 A | 7/2018 |

OTHER PUBLICATIONS

Jia, X., Song, S., He, W., Wang, Y., Rong, H., Zhou, F., Xie, L., Guo, Z., Yang, Y., Yu, L., Chen, T., Hu, G., Shi, S., & Chu, X.. (2018). Highly Scalable Deep Learning Training System with Mixed-Precision: Training ImageNet in Four Minutes. (Year: 2018).*

Wen, H., Zhou, S., Liang, Z., Zhang, Y., Feng, D., Zhou, X., & Yao, C.. (2016). Training Bit Fully Convolutional Network for Fast Semantic Segmentation. (Year: 2016).*

Jason Sachs, 2016 "Round Round Get Around: Why Fixed-Point Right Shifts Are Just Fine" archived by https://web.archive.org/web/20170706132623/https://www.embeddedrelated.com/showarticle/1015.php (Year: 2016).*

Kim, D., Lee, M., Choi, D., & Song, B. (2017). Multi-Modal Emotion Recognition Using Semi-Supervised Learning and Multiple Neural Networks in the Wild. In Proceedings of the 19th ACM International Conference on Multimodal Interaction (pp. 529-535). Association for Computing Machinery. (Year: 2017).*

J. Lee, C. Kim, S. Kang, D. Shin, S. Kim and H.- J. Yoo, "UNPU: An Energy-Efficient Deep Neural Network Accelerator With Fully Variable Weight Bit Precision," in IEEE Journal of Solid-State Circuits, vol. 54, No. 1, pp. 173-185, Jan. 2019, doi: 10.1109/JSSC.2018.2865489. (Year: 2019).*

Lin, X., Zhao, C., & Pan, W. (2017). Towards Accurate Binary Convolutional Neural Network. In Proceedings of the 31st International Conference on Neural Information Processing Systems (pp. 344-352). Curran Associates Inc.. (Year: 2017).*

Vukotić, V., Raymond, C., & Gravier, G. (2016). Bidirectional Joint Representation Learning with Symmetrical Deep Neural Networks for Multimodal and Crossmodal Applications. In Proceedings of the 2016 ACM on International Conference on Multimedia Retrieval (pp. 343-346). (Year: 2016).*

Artit Wangperawong, Cyrille Brun, Olav Laudy, & Rujikorn Pavasuthipaisit. (2016). Churn analysis using deep convolutional neural networks and autoencoders. (Year: 2016).*

Zhaoqi Li, Yu Ma, Catalina Vajiac, & Yunkai Zhang. (2018). Exploration of Numerical Precision in Deep Neural Networks. (Year: 2018).*

W. Choi, K. Choi and J. Park, "Low Cost Convolutional Neural Network Accelerator Based on Bi-Directional Filtering and Bit-Width Reduction," in IEEE Access, vol. 6, pp. 14734-14746, 2018, doi: 10.1109/ACCESS.2018.2816019. (Year: 2018).*

A. Karpathy, G. Toderici, S. Shetty, T. Leung, R. Sukthankar and L. Fei-Fei, "Large-Scale Video Classification with Convolutional Neural Networks," 2014 IEEE Conference on Computer Vision and Pattern Recognition, Columbus, OH, USA, 2014, pp. 1725-1732, doi: 10.1109/CVPR.2014.223. (Year: 2014).*

Sheng Chen, Yang Liu, Xiang Gao, & Zhen Han. (2018). MobileFaceNets: Efficient CNNs for Accurate Real-Time Face Verification on Mobile Devices. (Year: 2018).*

Zhengping Ji, et al. (2015) Reducing weight precision of convolutional neural networks towards large-scale on-chip image recognition, Proceedings vol. 9496, Independent Component Analyses, Compressive Sampling, Large Data Analyses (LDA), Neural Networks, Biosystems, and Nanoengineering XIII; (Year: 2015).*

Anwar, Saji et al., "Fixed Point Optimization of Deep Convolutional Neural Networks for Object Recognition." *2015 IEEE International Conference on Acoustics, Speech and Signal Processing (ICASSP)*, 2015 (pp. 1131-1135).

Ma, Xiaolong et al., "An Area and Energy Efficient Design of Domain-Wall Memory-Based Deep Convolutional Neural Networks using Stochastic Computing." *2018 19th International Symposium on Quality Electronic Design (ISQED)*, 2018 (pp. 1-8).

Chung, Jinil et al., "Domain Wall Memory-Based Design of Deep Neural Network Convolutional Layers." *IEEE Access*, vol. 8, 2020 (pp. 19783-19798).

Partial European Search Report issued on May 15, 2020 for the corresponding European Patent Application No. 19204904.7 (17 pages in English).

Kim, Eunwoo, et al., "NestedNet: Learning Nested Sparse Structures in Deep Neural Networks", *Computer Vision Foundation*, pp. 8669-8678.

Sachs, Jason "Round Round Get Around: Why Fixed-Point Right-Shifts Are Just Fine" EmbeddedRelated.com, Nov. 22, 2016, (10 pages).

Wen, He, et al. "Training Bit Fully Convolutional Network for Fast Semantic Segmentation." arXiv preprint arXiv:1612.00212 (2016)., (8 pages).

Micikevicius, Paulius, et al. "Mixed Precision Training." arXiv preprint arXiv:1710.03740 (2017)., (14 pages).

Jia, Xianyan, et al. "Highly Scalable Deep Learning Training System with Mixed-Precision: Training Imagenet in Four Minutes. CoRR abs/1807.11205 (2018)." arXiv preprint arXiv:1807.11205 (2018)., (9 pages).

Chinese Office Action issued on Jul. 14, 2024, in counterpart Chinese Patent Application No. 201910778533.5 (23 pages in English, 14 pages in Chinese).

Howard, Andrew G., et al., "MobileNets: Efficient Convolutional Neural Networks for Mobile Vision Applications", Apr. 2017, pp. 1-9.

Kim, Eunwoo, et al., "NestedNet: Learning Nested Sparse Structures in Deep Neural Networks", *Computer Vision Foundation*, pp. 8669-8678. ( Mar. 2018 ).

Korean Office Action issued on Dec. 17, 2024 in corresponding Korean Application No. 10-2018-0165585. (5pages in English, 9pages in Korean).

* cited by examiner

NEURAL NETWORK PROCESSING METHOD AND APPARATUS BASED ON NESTED BIT REPRESENTATION

CROSS-REFERENCE TO RELATED APPLICATIONS

This application claims the benefit under 35 USC § 119(a) of Korean Patent Application No. 10-2018-0165585 filed on Dec. 19, 2018, in the Korean Intellectual Property Office, the entire disclosure of which is incorporated herein by reference for all purposes.

BACKGROUND

1. Field

The following description relates to a neural network processing method and apparatus based on nested bit representation.

2. Description of Related Art

Technological automation of recognition processes, for example, has been implemented through processor implemented neural network models, as specialized computational architectures, which after substantial training may provide computationally intuitive mappings between input patterns and output patterns. The trained capability of generating such mappings may be referred to as a learning capability of the neural network. Further, because of the specialized training, such specially trained neural networks may thereby have a generalization capability of generating a relatively accurate output with respect to an input pattern that the neural network may not have been trained for, for example.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a neural network processor-implemented method includes obtaining first weights for a first layer of a source model corresponding to a first layer of a neural network, determining a bit-width for the first layer of the neural network, obtaining second weights for the first layer of the neural network by extracting at least one bit corresponding to the determined bit-width from each of the first weights for the first layer of the source model corresponding to the first layer of the neural network, and processing input data of the first layer of the neural network by executing the first layer of the neural network based on the obtained second weights.

The first weights may be configured to have a higher bit-precision than the second weights.

The second weights may be nested in the first weights.

The bit-width for the first layer of the neural network may be determined based on a processing characteristic corresponding to the first layer of the neural network, and the processing characteristic includes at least one of a required processing speed, a required processing accuracy, a processing difficulty, or a terminal performance.

The method may include determining a bit-width for a second layer of the neural network, obtaining third weights for a second layer of a source model corresponding to the second layer of the neural network, obtaining fourth weights for the second layer of the neural network by extracting at least one bit corresponding to the determined bit-width for the second layer of the neural network from each of the third weights for the second layer of the source model corresponding to the second layer of the neural network, and processing input data of the second layer of the neural network by executing the second layer of the neural network based on the obtained fourth weights.

The third weights may have a higher bit-precision than the fourth weights.

The fourth weights may be nested in the third weights. first layer of the neural network executed based on the second weights is configured to process a first task based on the input data of the first layer, and the second layer of the neural network executed based on the fourth weights is configured to process a second task different from the first task based on the input data of the second layer.

In a general aspect, a neural network processor-implemented method includes obtaining first weights for a source model of a first neural network, determining a bit-width for the first neural network, obtaining second weights for the first neural network by extracting at least one bit corresponding to the determined bit-width from each of the first weights for the source model, and processing input data of the first neural network by executing the first neural network based on the obtained second weights.

The first weights may be configured to have a higher bit-precision than the second weights.

The second weights may be nested in the first weights.

The method may include determining a bit-width for a second neural network based on a result of the processing of the input data by the executing of the first neural network, obtaining third weights for the second neural network by extracting at least one bit corresponding to the determined bit-width for the second neural network from each of the first weights, and processing input data of the second neural network by executing the second neural network based on the obtained third weights.

The first weights may be configured to have a higher bit-precision than the third weights.

The second weights and the third weights may be nested in the first weights.

The first neural network that is executed based on the second weights may be configured to process a first task based on the input data of the first neural network, and the second neural network that is executed based on the third weights is configured to process a second task that is different from the first task based on the input data of the second neural network.

The bit-width for the first neural network may be determined based on a processing characteristic corresponding to the first neural network, and wherein the processing characteristic may include at least one of a required processing speed, a required processing accuracy, a processing difficulty, or a terminal performance.

In a general aspect, a processor-implemented training method includes determining weights of a low bit-width corresponding to a first layer of a neural network by quantizing weights of a high bit-width corresponding to the first layer of the neural network, determining loss values corresponding to the determined weights of the low bit-width by applying input data to the first layer, and updating the weights of the high bit-width based on the determined loss values.

The method may further include determining weight sets of the low bit-width corresponding to the first layer by quantizing the weights of the high bit-width, after training associated with the weights of the high bit-width is completed.

The weight sets of the low bit-width may include a weight set of a first bit-width and a weight set of a second bit-width having a lower bit-precision than the weight set of the first bit-width, and wherein the weight set of the second bit-width is nested in the weight set of the first bit-width.

The weights of the low bit-width may include first weights of a first bit-width having a lower bit-precision than the weights of the high bit-width, and second weights of a second bit-width having a lower bit-precision than the first weights of the first bit-width.

The determining of the weights of the low bit-width may include determining the first weights of the first bit-width by quantizing the weights of the high bit-width, and determining the second weights of the second bit-width by extracting at least one bit from each of the determined first weights of the first bit-width.

The determining of the weights of the low bit-width may include determining the second weights of the second bit-width by quantizing the weights of the high bit-width, determining the determined second weights of the second bit-width to be an upper bit group of the first weights of the first bit-width, and determining a lower bit group of the first weights of the first bit-width by quantizing the weights of the high bit-width.

The updating of the weights of the high bit-width may include updating the weights of the high bit-width based on statistical information of loss gradients corresponding to the determined loss values.

The updating of the weights of the high bit-width may further include calculating the statistical information by assigning a high weighted value to a loss gradient corresponding to a weight for which a high priority is set among the weights of the low bit-width.

In a general aspect, a neural network apparatus includes a processor, and a memory configured to store an instruction readable by the processor, wherein, when the instruction is executed by the processor, the processor is configured to obtain first weights for a first layer of a source model of a first layer of a neural network, determine a bit-width for the first layer of the neural network, obtain second weights for the first layer of the neural network by extracting at least one bit corresponding to the determined bit-width from each of the first weights for the first layer of the source model corresponding to the first layer of the neural network, and process input data of the first layer of the neural network by executing the first layer of the neural network based on the obtained second weights.

The processor may be configured to determine a bit-width for a second layer of the neural network, obtain third weights for a second layer of a source model corresponding to the second layer of the neural network, obtain fourth weights for the second layer of the neural network by extracting at least one bit corresponding to the determined bit-width for the second layer of the neural network from each of the third weights for the second layer of the source model corresponding to the second layer of the neural network, and process input data of the second layer of the neural network by executing the second layer of the neural network based on the obtained fourth weights.

In a general aspect, a neural network processing apparatus includes a processor and a memory configured to store an instruction readable by the processor, wherein, when the instruction is executed by the processor, the processor is configured to obtain first weights for a source model of a first neural network, determine a bit-width for the first neural network, obtain second weights for the first neural network by extracting at least one bit corresponding to the determined bit-width from each of first weights for the source model, and process input data of the first neural network by executing the first neural network based on the obtained second weights.

The processor may be configured to determine a bit-width for a second neural network based on a result of processing the input data by the first neural network, obtain third weights for the second neural network by extracting at least one bit corresponding to the determined bit-width for the second neural network from each of the first weights, and process input data of the second neural network by executing the second neural network based on the obtained third weights.

In a general aspect, a neural network training apparatus includes a processor, and a memory configured to store an instruction readable by the processor, wherein, when the instruction is executed by the processor, the processor is configured to determine weights of a low bit-width corresponding to a first layer of a neural network by quantizing weights of a high bit-width corresponding to the first layer of the neural network, determine loss values corresponding to the determined weights of the low bit-width by applying input data to the first layer, and update the weights of the high bit-width based on the determined loss values.

The weights of the low bit-width may include first weights of a first bit-width having a lower bit-precision than the weights of the high bit-width, and second weights of a second bit-width having a lower bit-precision than the first weights of the first bit-width.

The processor may be configured to determine the first weights of the first bit-width by quantizing the weights of the high bit-width, and determine the second weights of the second bit-width by extracting at least one bit from each of the determined first weights of the first bit-width.

The processor may be configured to determine the second weights of the second bit-width by quantizing the weights of the high bit-width, determine the determined second weights of the second bit-width to be upper bits of the first weights of the first bit-width, and determine lower bits of the first weights of the first bit-width by quantizing the weights of the high bit-width.

In a general aspect, a processor-implemented method includes receiving multilevel input data, executing a first neural network based on first weights that are trained to process a first task based on the received input data, executing a second neural network based on second weights that are trained to process a second task based on the received input data, and outputting multilevel input data based on the processed first task and the processed second task.

The first weights may be configured to have a first bit-width and the second weights are configured to have a second bit-width different from the first bit-width.

The multilevel data may be one or more of multilevel image data and multilevel voice data.

Other features and aspects will be apparent from the following detailed description, the drawings, and the claims.

Figure 1:
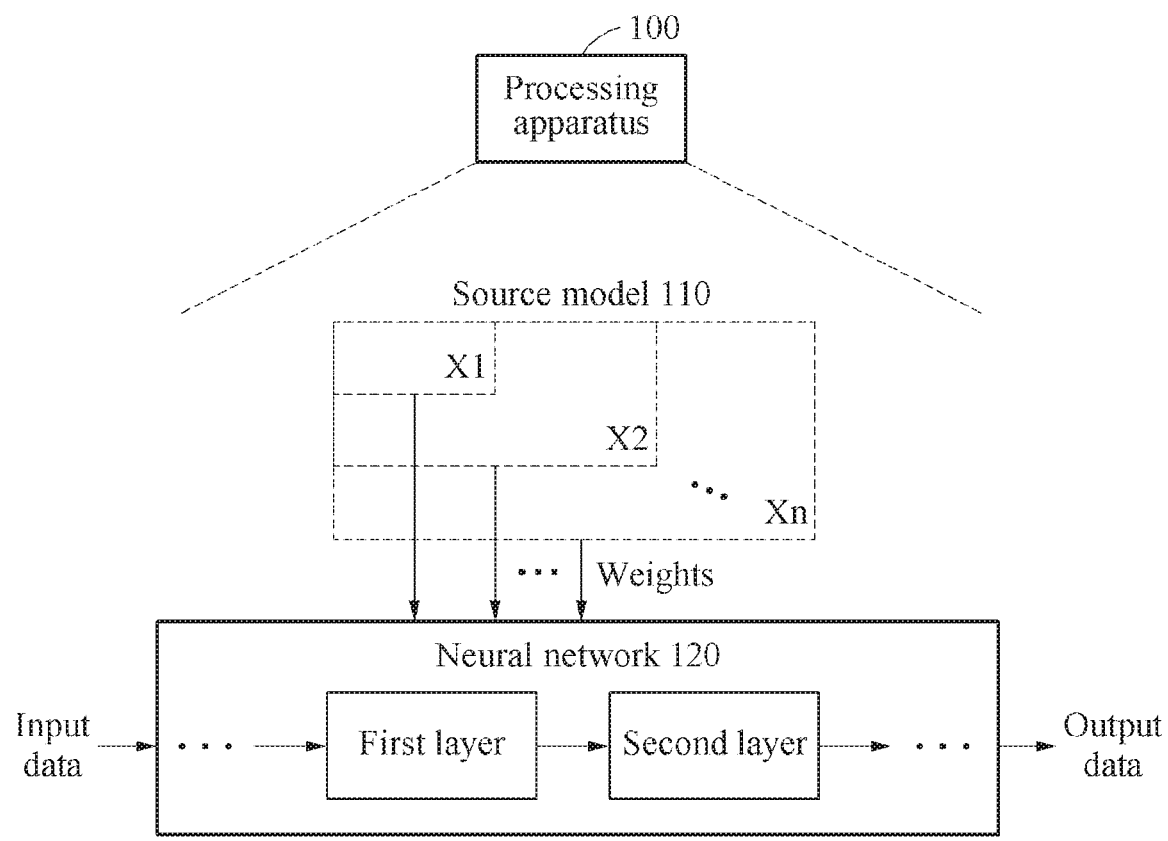
FIG. 1 is a diagram illustrating an example of a nested bit representation-based neural network processing apparatus, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 is a diagram illustrating an example of a nested bit representation-based neural network processing apparatus. The neural network processing apparatus will be hereinafter simply referred to as a processing apparatus.

Referring to FIG. 1, a processing apparatus 100 processes an operation of a neural network 120. The operation of the neural network 120 may include, for example, recognizing or verifying an object in an input image, but is not limited thereto. At least a portion of processing operations associated with the neural network 120 to be described hereinafter may be embodied by software, hardware including a neural processor, or a combination of software and hardware.

The neural network 120 may include all types of neural networks that may operate based on a weight. For example, the neural network 120 may be a deep neural network (DNN) as a non-limiting example. In such an example, the DNN may be one or more of a fully connected network, a deep convolutional network, and/or a recurrent neural network (RNN), or may include different or overlapping neural network portions respectively with such full, convolutional, or recurrent connections. Although the following description focuses on a convolutional neural network (CNN) as one example of the neural network 120, it may also be applicable to other types of neural network operating based on a weight.

The neural network 120 may be configured to perform, as non-limiting examples, object recognition and object verification by mapping input data and output data which are in a nonlinear relationship, based on deep learning. Such deep learning is indicative of processor-implemented machine learning methods for automated recognition of an image or voice (or speech) from a big dataset, as non-limiting examples. The deep learning may be construed as a problem-solving process for optimization that locates a point at which energy is minimized while training the neural network 120 using prepared training data. The deep learning may be implemented by mapping of input data and the output data through supervised or unsupervised learning or training, through which a weight corresponding to an architecture or a model of the neural network 120 is obtained. Through such obtained weight, the input data and the output data may be mapped. In the CNN, the deep learning may be performed based on weights of weight kernels used in convolutional layers.

The example neural network 120 may include a plurality of layers which includes an input layer, at least one hidden layer, and an output layer. The input layer and the output layer may respectively include one or more nodes and the hidden layer may each include a plurality of nodes. For example, as illustrated, a first layer and a second layer included in the example neural network 120 may be at least a portion of the plurality of layers. Although it is illustrated in the example of FIG. 1 that the two layers are included in the neural network 120, this example is provided for convenience of description, and thus a greater number of layers may be included in the neural network 120. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Referring to FIG. 1, a source model 110 may include weights of a first bit-width X1 through an nth bit-width Xn. In this example, when n of Xn increases, a bit-width increases. The processing apparatus 100 may execute the neural network 120 by selecting weights of a desirable bit-width from the source model 110. That is, a selective variable bit-width may be applied to the neural network 120. The source model 110 selects the weights of the desirable bit-width based on a processing characteristic of the neural network 120. For example, the processing characteristic may include at least one of a required processing speed, a required processing accuracy, a processing difficulty, or a terminal performance. In this example, the accuracy may correspond to a false acceptance rate (FAR) or a verification rate (VR).

For example, in an example in which a high processing speed may be beneficial or data is processed in a mobile terminal with insufficient resources, the source model 110 may execute the neural network 120 with the first bit-width X1 corresponding to a low bit-width. In another example, in an example in which a high processing accuracy is beneficial or a high processing difficulty is beneficial, the source model 110 may execute the neural network 120 with the nth bit-width Xn corresponding to a high bit-width. A bit-precision corresponds to a bit-width, and thus a variable bit-width may indicate a variable bit-precision.

In one example, a bit-width of weights may be adjusted for each at least one layer. For example, weights corresponding to the first bit-width X1 may be applied to the first layer and weights corresponding to the second bit-width X2 may be applied to a second layer of the neural network 120, and thus a bit-width of weights may be adjusted for each layer as described in the foregoing. Alternatively, weights corresponding to the first bit-width X1 may be applied to the first through third layers of the neural network 120 and weights corresponding to the second bit-width X2 may be applied to fourth and fifth layers of the neural network 120, and thus a bit-width of weights may be adjusted for each at least two layers as described in the foregoing.

In this example, a bit-width of weights to be applied to at least one layer may be determined based on a processing characteristic of the layer. For example, to a layer for which a high processing speed is beneficial, or a layer in which data is processed in a mobile terminal with insufficient resources, weights of a low bit-width may be applied. In contrast, to a layer for which a high processing accuracy is beneficial, or a layer with a high processing difficulty, weights of a high bit-width may be applied.

In another example, a bit-width of weights may be adjusted for each neural network. For example, weights corresponding to the first bit-width X1 may be applied to a first neural network, and weights corresponding to the second bit-width X2 may be applied to a second neural network. In this example, a bit-width of weights to be applied to each neural network may be determined based on a processing characteristic of a corresponding neural network. For example, to a neural network processing an operation with a relatively low difficulty, such as, for example, face sensing or detection, weights of a low bit-width may be applied. In contrast, to a neural network processing an operation with a relatively high difficulty, such as, for example, face verification or recognition, weights of a high bit-width may be applied.

However, when the weights of the first bit-width X1 through the nth bit-width Xn included in the source model 110 occupy independent memory spaces, a memory efficiency may decrease. Thus, bits corresponding to the weights of the first bit-width X1 through the nth bit-width Xn may be nested, and thus the memory spaces may be efficiently used. For example, the weights of the first bit-width X1 through the nth bit-width Xn included in the source model 110 may be nested. In this example, the weights of the first bit-width X1 may be nested in the weights of the second bit-width X2 and the weights of the nth bit-width Xn, and the weights of the second bit-width X2 may be nested in the weights of the nth bit-width Xn. Such nested bit representation will be described in detail with reference to FIG. 2.

Figure 2:
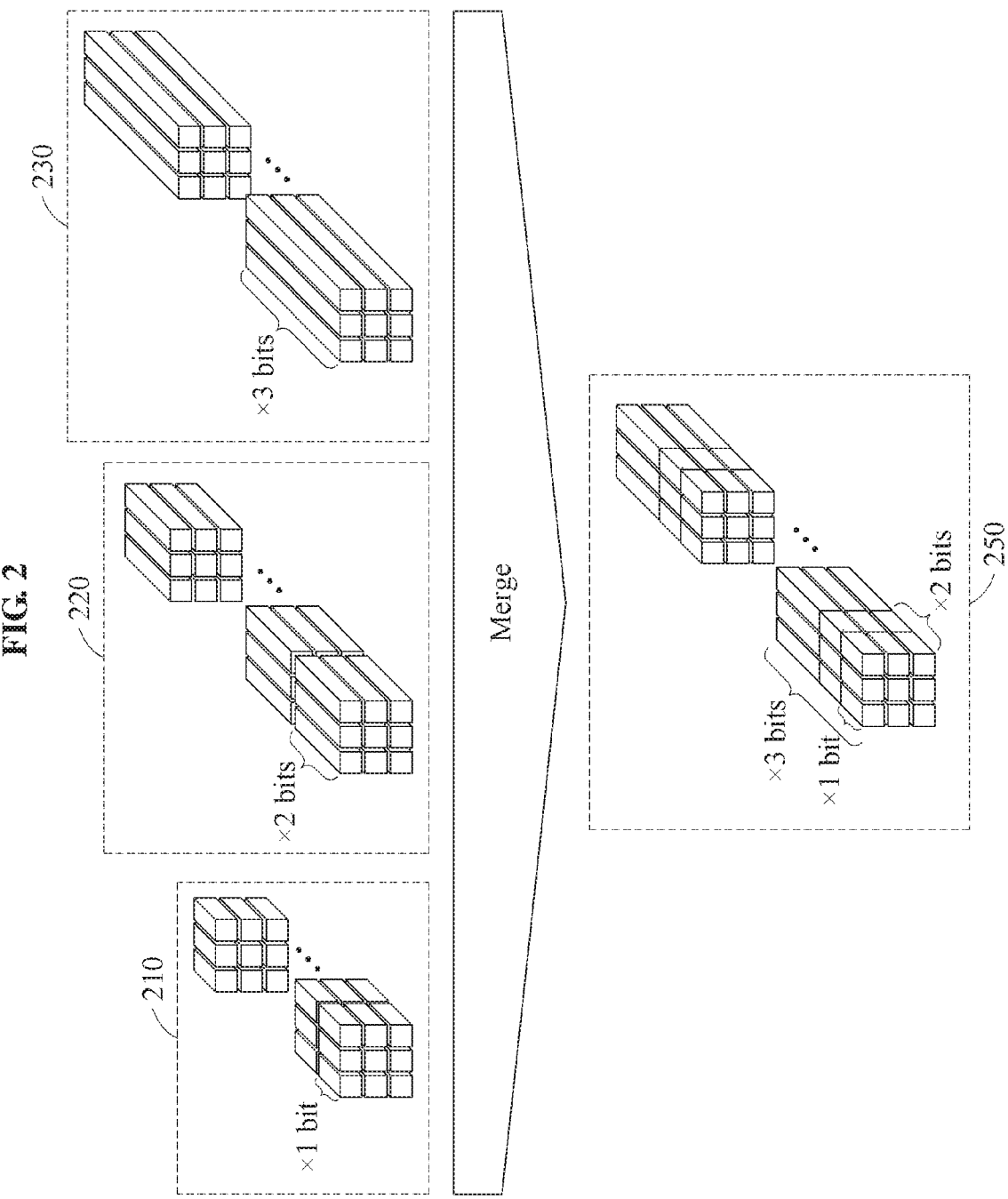
FIG. 2 is a diagram illustrating an example of a nested bit representation, in accordance with one or more embodiments.

FIG. 2 is a diagram illustrating an example of a nested bit representation. In the example of FIG. 2, weights of a weight kernel of a CNN are represented by nested bits. Such nested bit representation may be applicable to other types of neural networks. Referring to FIG. 2, there are 3*3 weight kernels 210, 220, and 230. Each element of weight kernels may correspond to one weight, or weight value.

In this example, weights of the weight kernel 210 are represented by X1 bits, weights of the weight kernel 220 are represented by X2 bits, and weights of the weight kernel 230 are represented by X3 bits. In this example, X2 is a greater value than X1, and X3 is a greater value than X2. For example, the X1 bits may be 2 bits, the X2 bits may be 4 bits, and the X3 bits may be 8 bits. However, the values of X1 through X3 are not limited to the example values described in the foregoing, and the weights may be represented by greater types or less types of bit-width in addition to X1 through X3.

in an example, the weight kernels 210, 220, and 230 may share bit values. For example, a first element at a certain location of the weight kernel 210 may have a weight value of $01_{(2)}$, a second element at a corresponding location of the weight kernel 220 may have a weight value of $0111_{(2)}$, and a third element at a corresponding location of the weight kernel 230 may have a weight value of $01110100_{(2)}$. In this example, (2) indicates a binary representation. Thus, the first through third elements may share bit values of $01_{(2)}$ and the second and third elements may share bit values of $0111_{(2)}$, and thus the first through third elements may be represented by being nested.

As described above, the weight kernels 210, 220, and 230 may share bit values among corresponding elements, and may thus be merged to define a nested bit model 250. To store the nested bit model 250, only a memory space for the weight kernel 230 may be required, and thus a memory efficiency may be improved through the nested bit model 250.

Referring back to FIG. 1, the weights of the first bit-width X1 through the nth bit-width Xn included in the source model 110 may correspond to the nested bit model 250 described above with reference to FIG. 2. For example, the weights of the first bit-width X1 may correspond to the weight kernel 210, the weights of the second bit-width X2 may correspond to the weight kernel 220, and the weights of the nth bit-width Xn may correspond to the weight kernel 230. Thus, all the weights of the first bit-width X1 through the nth bit-width Xn may be stored in a memory space for the weights of the nth bit-width Xn The neural network 120 (FIG. 1) may be trained based on training data in a training process, and may perform an inference operation such as, for example, classification, recognition, and detection, with respect to input data in an inference process. The weights of the first bit-width X1 through the nth bit-width Xn included in the source model 110 (FIG. 1) may be determined through the training process. The training may be performed offline or online. Due to a recent introduction of hardware with accelerated training, such as, for example, a neural processor, online training may be possible.

In an example, a weight kernel may be predetermined, which indicates that it is determined before the neural network 120 (FIG. 1) is initiated. The neural network 120 (FIG. 1) being initiated may indicate that the neural network 120 is ready for inference. For example, that the neural network 120 (FIG. 1) is initiated may indicate that the neural network 120 (FIG. 1) is loaded in a memory, or that input data for the inference is input to the neural network 120 (FIG. 1) after the neural network 120 (FIG. 1) is loaded in the memory.

Figure 3:
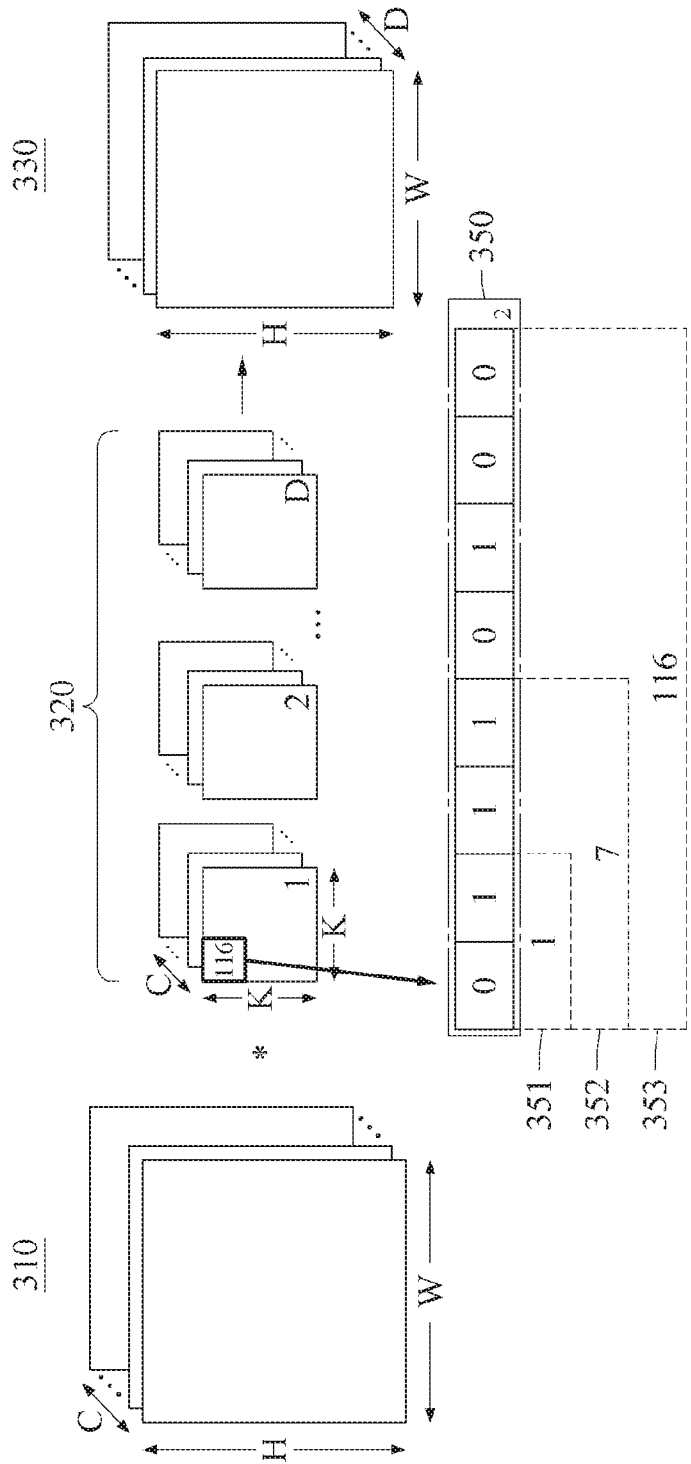
FIG. 3 is a diagram illustrating an example of weights based on a nested bit representation, in accordance with one or more embodiments.

FIG. 3 is a diagram illustrating an example of weights based on a nested bit representation.

Referring to FIG. 3, output data 330 is determined based on an operation between input data 310 and weight kernels 320. In this example, the input data 310 has an H*W*C dimension, and each of the weight kernels 320 has a K*K*C dimension and the weight kernels 320 are classified into D groups. The output data 330 has an H*W*D dimension. In this example, the input data 310, the weight kernels 320, and the output data 330 may be associated with a first layer.

The weight kernels 320 include an element having a weight of $116_{(10)}$, which is hereinafter simply referred to as a first element. In this example, $116_{(10)}$ is represented as $01110100_{(2)}$, in which $_{(10)}$ indicates a decimal representation and $_{(2)}$ indicates a binary representation. A source model includes a weight value 350 corresponding to $01110100_{(2)}$ for the first element.

A processing apparatus may determine a bit-width for the first layer, which is hereinafter referred to as a first bit-width. In addition, the processing apparatus may obtain a weight value for the first element by extracting at least one bit corresponding to the first bit-width from the weight value 350. For example, as illustrated, in an example in which the determined bit-width is 2 bits, the processing apparatus may obtain a weight value 351 by extracting $01_{(2)}$ from the weight value 350. In an example in which the determined bit-width is 4 bits, the processing apparatus obtains a weight value 352 by extracting $0111_{(2)}$ from the weight value 350. In an example in which the determined bit-width is 8 bits, the processing apparatus obtains a weight value 353 by extracting $01110100_{(2)}$ from the weight value 350. In this example, 2 bits, 4 bits, and 8 bits are provided as example bit-widths that may be represented by the source model, and thus the source model may represent a greater number of bit-widths.

The processing apparatus may also obtain weight values for remaining elements of the weight kernels 320 by extracting at least one bit corresponding to the first bit-width from weight values of the source model corresponding to the remaining elements of the weight kernels 320. The processing apparatus processes the input data 310 by executing the first layer based on the obtained weight values. For example, as illustrated, the processing apparatus performs an operation between the input data 310 and the weight kernels 320 by executing the first layer, and determines the output data 330 as a result of performing the operation. Although the example of FIG. 3 focuses on a single layer, weights for an entire single neural network may be set through a process corresponding to a process described above with reference to FIG. 3.

In the example of FIG. 3, $01_{(2)}$ corresponds to $1_{(10)}$, $0111_{(2)}$ corresponds to $7_{(10)}$, and $01110100_{(2)}$ corresponds to $116_{(10)}$. This indicates that a weight value varies based on bit extraction. Thus, a model of a nested bit representation may need to be trained to correspond to a change in each weight value based on a change in bit-width. Hereinafter, training a model of a nested bit representation, or a source model, will be described in detail.

Figure 4:
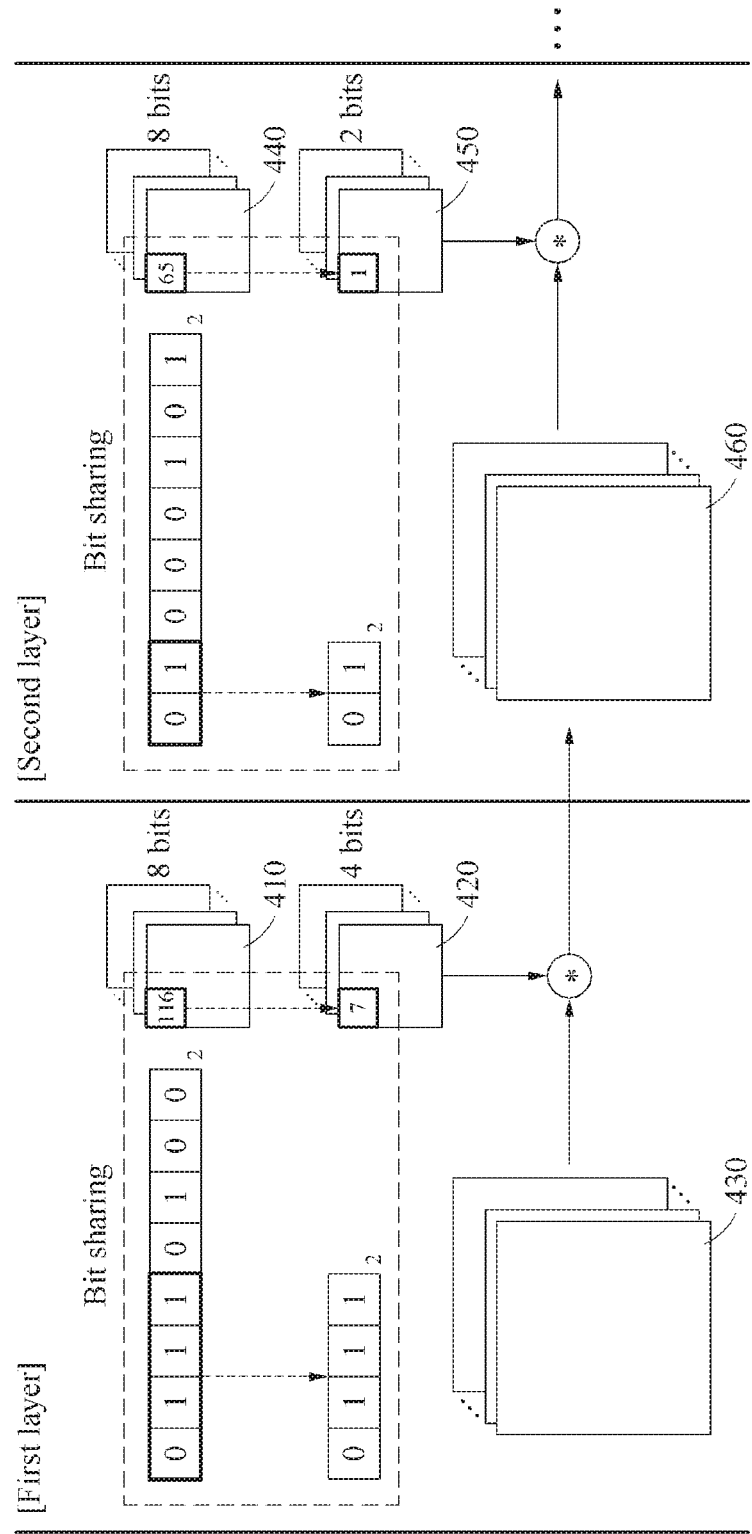
FIG. 4 is a diagram illustrating an example of adjustment of a bit-width of weights for each at least one layer, in accordance with one or more embodiments.

FIG. 4 is a diagram illustrating an example of adjustment of a bit-width of weights for each at least one layer.

Referring to FIG. 4, a processing apparatus determines a bit-width for a first layer. In the example of FIG. 4, the bit-width for the first layer is determined to be 4 bits. The processing apparatus obtains weights 420 for the first layer by extracting at least one bit corresponding to the bit-width of 4 bits from each of weights 410 for a first layer of a source model corresponding to the first layer. For example, as illustrated, the processing apparatus obtains a corresponding element in the weights 420 by extracting upper 4 bits, $0111_{(2)}$, from an element in the weights 410 which is $01110100_{(2)}$.

The processing apparatus obtains the weights 420 for the first layer by extracting 4 bits from each of remaining elements in the weights 410. Through such bit extraction, $01110100_{(2)}$ and $0111_{(2)}$ may share bits. The processing apparatus processes input data 430 of the first layer by executing the first layer based on the obtained weights 420.

A process corresponding to the process performed on the first layer may be performed on a second layer. The processing apparatus determines a bit-width for the second layer. The processing apparatus may determine, for the second layer, a same bit-width as the bit-width determined for the first layer, or may determine a bit-width for the second layer to be different from the bit-width determined for the first layer. In the example of FIG. 4, the bit-width for the second layer is determined to be 2 bits. However, this is only an example, and the bit-width for the second layer may be greater than 2 bits.

The processing apparatus obtains weights 450 for the second layer by extracting at least one bit corresponding to the bit-width of 2 bits from each of weights 440 for a second layer of the source model corresponding to the second layer. For example, as illustrated, the processing apparatus obtains a corresponding element in the weights 450 by extracting upper 2 bits, $01_{(2)}$, from an element in the weights 440 which is $01000101_{(2)}$. The processing apparatus obtains the weights 450 for the second layer by extracting 2 bits from each of remaining elements in the weights 440. In this example, $01000101_{(2)}$ and $01_{(2)}$ may share bits. The processing apparatus processes input data 460 of the second layer by executing the second layer based on the obtained weights 450.

A process corresponding to the process performed on the first layer and the second layer may be performed on subsequent layers of the second layer. As described above, the processing apparatus may adjust a bit-width of weights for each layer, or adjust a bit-width of weights for each at least two layers. A bit-width of weights to be applied to at least one layer may be determined based on a processing characteristic of the layer. The processing characteristic may include at least one of a required processing speed, a required processing accuracy, a processing difficulty, or a terminal performance.

Figure 5:
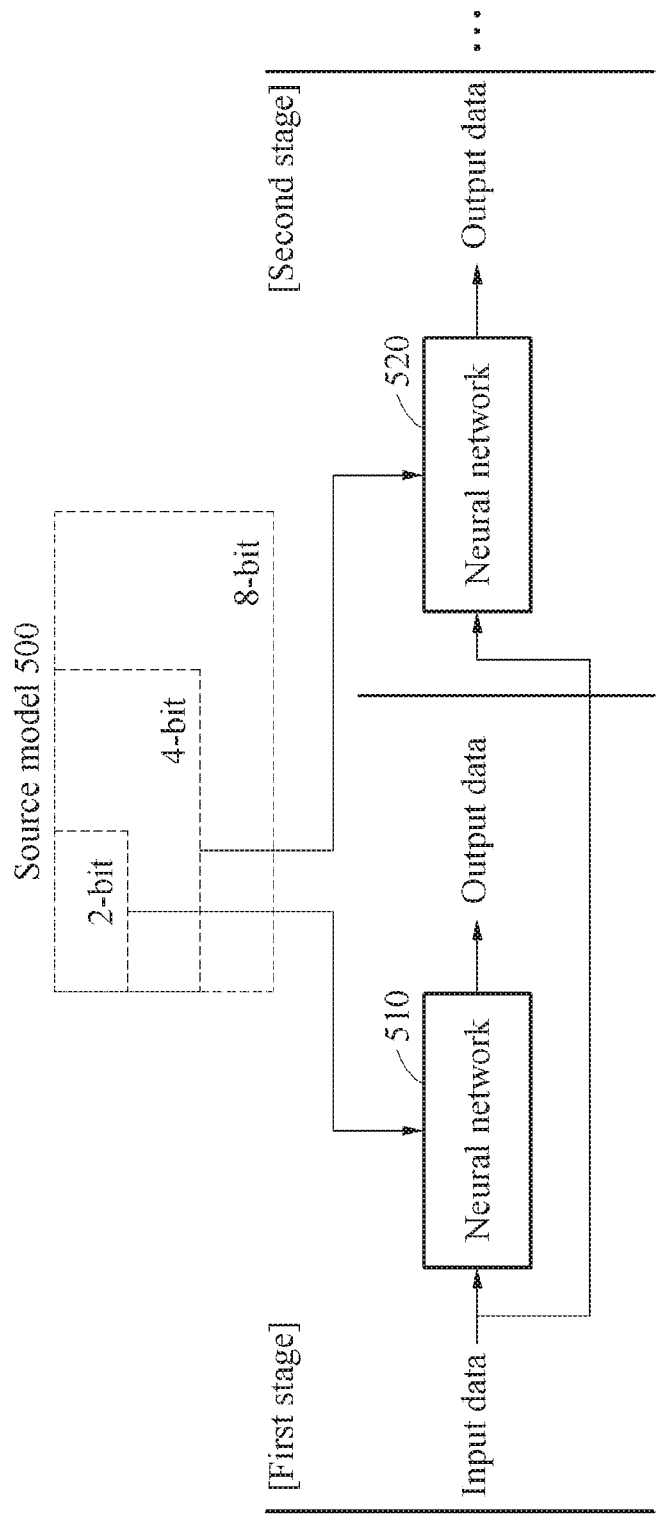
FIG. 5 is a diagram illustrating an example of adjustment of a bit-width of weights for each neural network, in accordance with one or more embodiments.

FIG. 5 is a diagram illustrating an example of adjustment of a bit-width of weights for each neural network.

Referring to FIG. 5, a processing apparatus determines a bit-width for a neural network 510. In the example of FIG. 5, the bit-width for the neural network 510 is determined to be 2 bits. The processing apparatus obtains second weights for the neural network 510 by extracting at least one bit corresponding to the bit-width of 2 bits from each of first weights for a source model 500. The processing apparatus processes input data of the neural network 510 by executing the neural network 510 based on the obtained second weights.

A process corresponding to the foregoing process performed on the neural network 510 may also be performed on a neural network 520. The processing apparatus determines a bit-width for the neural network 520. In the example of FIG. 5, the processing apparatus determines the bit-width for the neural network 520 based on a result of processing the input data by the neural network 510. For example, the neural network 510 may process face sensing, and the neural network 520 may process face detection. In this example, when the neural network 510 succeeds in sensing a face, the processing apparatus may determine a bit-width for the neural network 520 to execute the neural network 520. For example, a bit-width for the neural network 510 may be determined to be 2 bits for the face sensing process, which may be implemented with relatively less difficulty, and a bit-width for the neural network 520 may be determined to be 4 bits for the face detection process, which may be implemented with relatively greater difficulty.

The processing apparatus obtains third weights for the neural network 520 by extracting at least one bit corresponding to the bit-width of 2 bits from each of the first weights for the source model 500. The processing apparatus processes input data of the neural network 520 by executing the neural network 520 based on the obtained third weights. The input data of the neural network 520 may have a relatively higher quality or resolution compared to the quality or resolution of the input data of the neural network 510. For example, a low-resolution image may be provided as the input data to the neural network 510 in a low-resolution mode. In this example, when the neural network 510 succeeds in sensing a face, a high-resolution image may be provided as the input data to the neural network 520 in a high-resolution mode.

Figure 6:
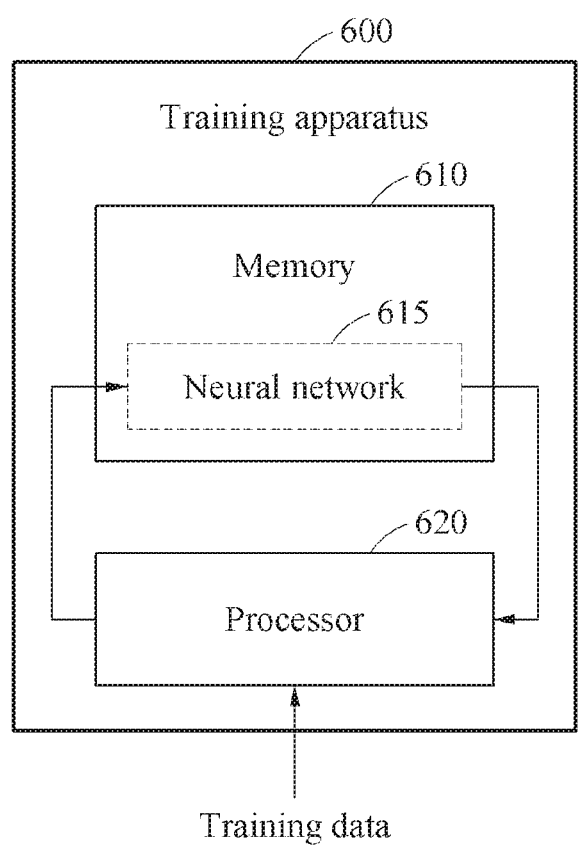
FIG. 6 is a diagram illustrating an example of a nested bit representation-based training apparatus, in accordance with one or more embodiments.

FIG. 6 is a diagram illustrating an example of a nested bit representation-based training apparatus. The nested bit representation-based training apparatus may also be referred to as a neural network training apparatus, and will be hereinafter simply referred to as a training apparatus.

Referring to FIG. 6, a training apparatus 600 includes a memory 610 and a processor 620. Although a single processor 620 is illustrated, this is only an example, and the training apparatus 600 may include one or more processors. The memory 610 is hardware and may store a neural network 615. The memory 610 may be local memory and/or a main memory, for example. The processor 620 is hardware, and may obtain the neural network 615 from the memory 610, and may train the neural network 615 based on training data. The memory 610 may store an instruction readable by the processor 620, and the processor 620 may perform an operation to train the neural network 615 when the instruction stored in the memory 610 is executed by the processor 620.

The training data may include a training input and a training output. The training input may be input data that is to be input to the neural network 615 and include, for example, image data and voice data. The training output, which is data mapped to the training input, may be, for example, a label to be output from the neural network 615 in response to the training input being input to the neural network 615. The training data may also be referred to as input data.

The processor 620 trains the neural network 615 such that the training output is obtained from the training input. The training of the neural network 615 may include training a parameter of the neural network 615, updating the neural network 615, or updating the parameter of the neural network 615, though examples also include such training and updating of multiple parameters until the neural network 615 is fully trained to an acceptable form.

For example, the processor 620 may determine weights of a low bit-width (also referred to as low bit-width weights) corresponding to a first layer of the neural network 615 by quantizing weights of a high bit-width (also referred to as high bit-width weights) corresponding to the first layer of the neural network 615, and determine loss values corresponding to the determined low bit-width weights by applying the training input to the first layer. The processor 620 may update the high bit-width weights based on the determined loss values. Such foregoing process may repeat for all layers of the neural network 615.

After training associated with the high bit-width weights is completed, the processor 620 may determine low bit-width weight sets by quantizing the high bit-width weights. For example, the low bit-width weight sets may correspond to the source model 110 of FIG. 1. The low bit-width weight sets may include, for example, first through nth bit-width weights that are represented as being nested.

A process of such training for the neural network 615 may include a forward process to determine loss values, and a backward process to update weights through backpropagation. According to an example, weights of various bit-widths may be trained through a single training process. The forward process and the backward process used to train the neural network 615 will be described in detail hereinafter.

Figure 7:
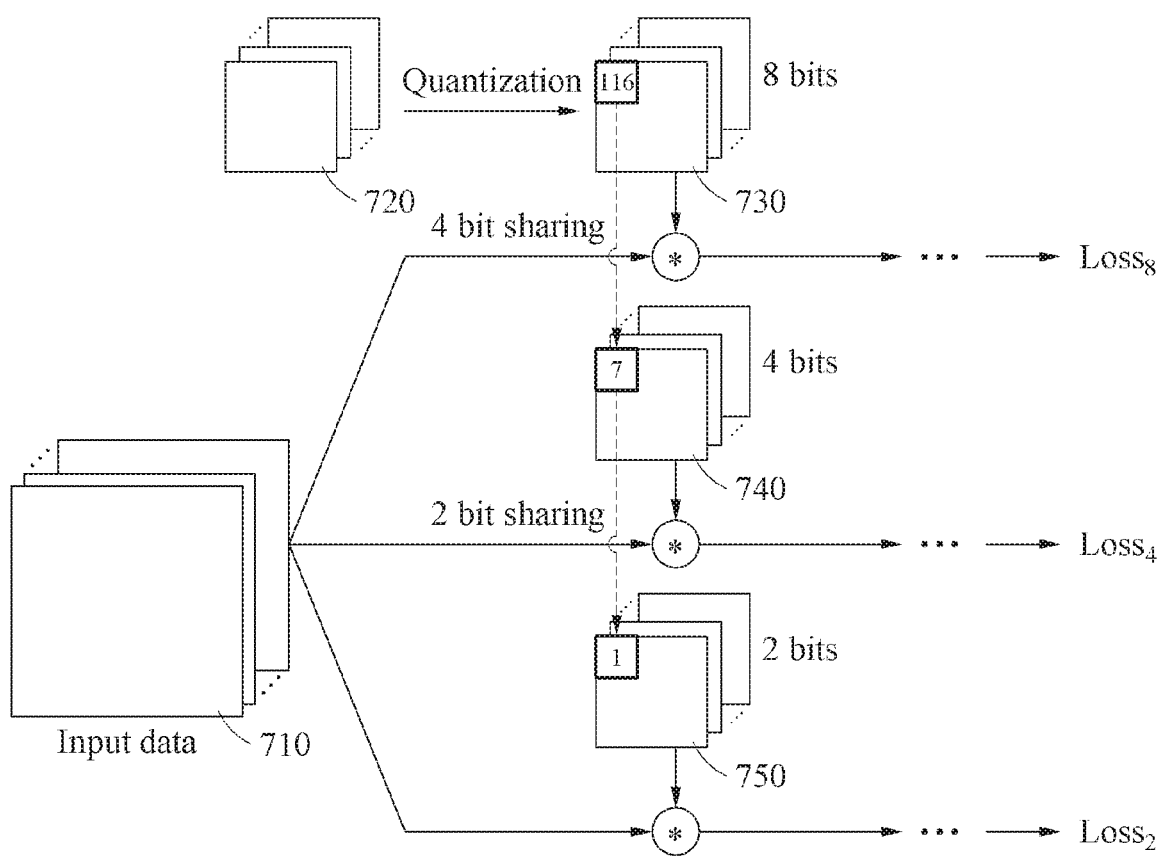
FIG. 7 is a diagram illustrating an example of a forward process for training, in accordance with one or more embodiments.

FIG. 7 is a diagram illustrating an example of a forward process for training.

In the example of FIG. 7, illustrated are input data 710, high bit-width weights 720, and low bit-width weights 730 through 750. The weights 720 have a bit-precision higher than those of the weights 730 through 750. For example, as illustrated, the weights 730, 740, and 750 are represented by a bit-width of 8 bits, a bit-width of 4 bits, and a bit-width of 2 bits, respectively. The weights 720 are represented by a bit-width of 32 bits, for example, a floating type. The illustrated numbers of bits are provided merely as examples, and thus the weights 720 through 750 may be represented by other various numbers of bits. The weights 730 may have a higher bit-precision than the weights 740, and the weights 740 may have a higher bit-precision than the weights 750. In this example of FIG. 7, the input data 710, the high bit-width weights 720, and the low bit-width weights 730 through 750 may correspond to a first layer of a neural network.

A training apparatus determines the weights 730 through 750 by quantizing the weights 720. The training apparatus determines the weights 730 by quantizing the weights 720, determines the weights 740 by extracting at least one bit from each of the weights 730, and determines the weights 750 by extracting at least one bit from each of the weights 740. Through such a process, the weights 730 through 750 may share bits. For example, as illustrated in FIG. 7, the weights 730 and the weights 740 may share 4 bits, and the weights 740 and the weights 750 may share 2 bits.

The training apparatus determines loss values respectively corresponding to the weights 730, 740, and 750, for example, $Loss_8$, $Loss_4$, and $Loss_2$ as illustrated, by applying the input data 710 to the first layer. The loss values $Loss_8$, $Loss_4$, and $Loss_2$ may correspond to outputs of the neural network by the first layer and subsequent layers of the first layer. The weights 730, 740, and 750 are used to determine the loss values $Loss_8$, $Loss_4$, and $Loss_2$ in the forward process, and the weights 720 are updated based on the loss values $Loss_8$, $Loss_4$, and $Loss_2$ in a backward process. The backward process will be described in detail hereinafter.

When training the weights 720 is completed through such foregoing process, a source model is determined by quantizing the weights 720 for which the training is completed to the bit-widths corresponding to the weights 730 through 750. For example, a first weight set having a bit-width of 8 bits may be determined by quantizing the weights 720 for which the training is completed, a second weight set having a bit-width of 4 bits may be determined by extracting at least one bit from each of weights of the first weight set, and a third weight set having a bit-width of 2 bits may be determined by extracting at least one bit from each of weights of the second weight set. The numbers of bits described in the foregoing are provided merely as examples, and thus the weight sets may be represented by various numbers of bits corresponding to the weights 730 through 750. The determined weight sets may correspond to the source model 110 of FIG. 1.

The weights 720 may be optimized based on the weights 730 through 750, and the weight sets may have the bit-widths corresponding to the weights 730 through 750. Thus, although a weight value varies due to bit extraction, each weight value may remain in an optimized state. Further, low bit-width weights having different bit-widths may affect one another, and the weights may thus remain optimized states although the weights of the various bit-widths are trained through a single training process.

Figure 8:
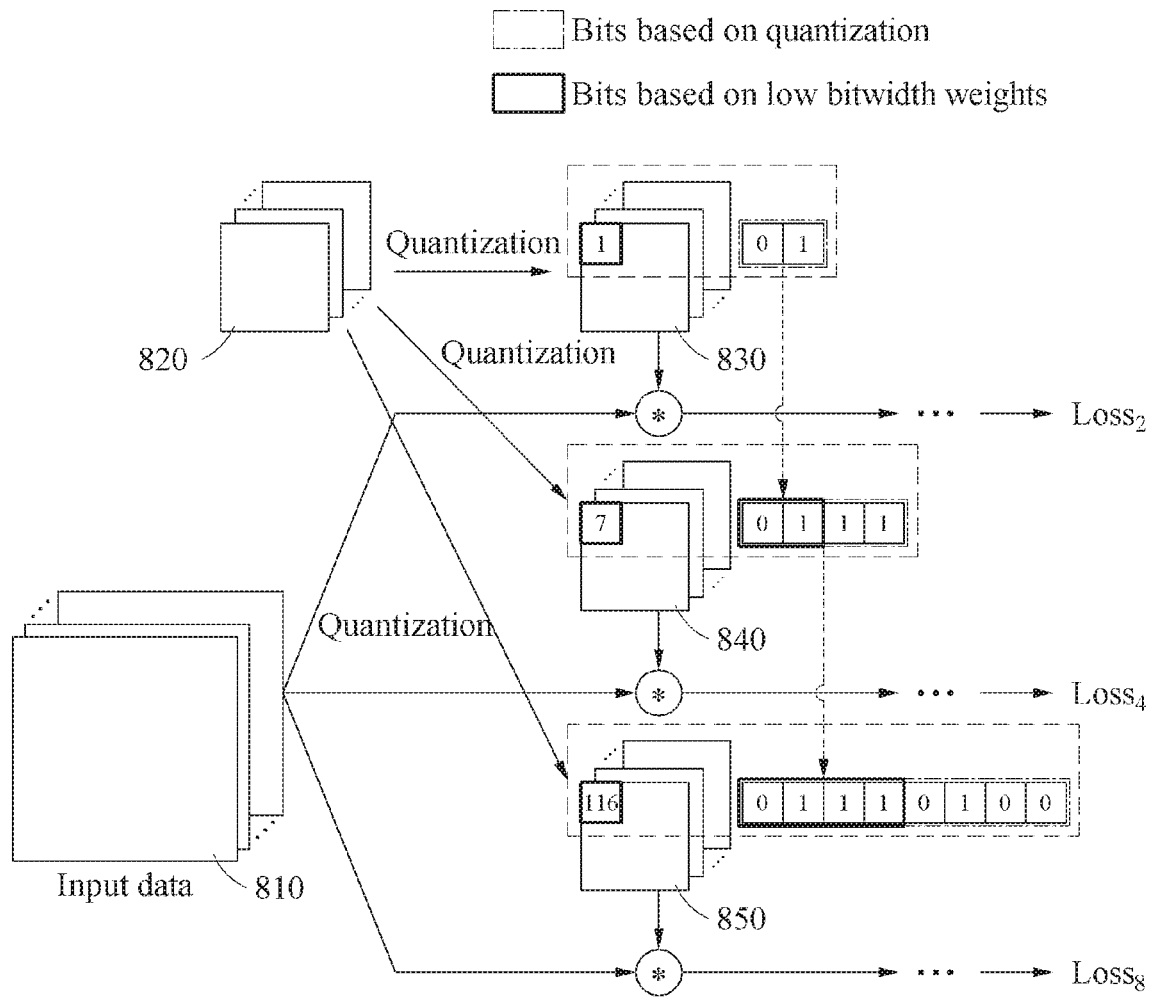
FIG. 8 is a diagram illustrating another example of a forward process for training, in accordance with one or more embodiments.

FIG. 8 is a diagram illustrating another example of a forward process for training.

In the example of FIG. 8, illustrated are input data 810, high bit-width weights 820, and low bit-width weights 830 through 850. The weights 820 have a higher bit-precision than the weights 830 through 850. For example, in a non-limiting example, as illustrated, the weights 830, 840, and 850 are represented by a bit-width of 2 bits, a bit-width of 4 bits, and a bit-width of 8 bits, respectively. The weights 820 are represented by a bit-width of 32 bits, for example, a floating type. The illustrated numbers of bits are provided merely as examples, and thus the weights 820 through 850 may be represented by other various numbers of bits. The weights 830 have a lower bit-precision than the weights 840, and the weights 840 have a lower bit-precision than the weights 850. In this example of FIG. 8, the input data 810, the high bit-width weights 820, and the low bit-width weights 830 through 850 may correspond to a first layer of a neural network.

A training apparatus determines the weights 830 through 850 by quantizing the weights 820. The training apparatus determines the weights 830 by quantizing the weights 820, and determines the weights 840 based on the weights 820 and the weights 830. For example, the training apparatus may determine the weights 830 to be an upper bit group of the weights 840, and determine a lower bit group of the weights 840 by quantizing the weights 820. The training apparatus may perform quantization such that the weights 840 have values corresponding to the weights 820 while the upper bit group of the weights 840 is fixed.

Through a process corresponding to such foregoing process of determining the weights 840, the training apparatus determines the weights 850 based on the weights 820 and the weights 840. For example, the training apparatus may determine the weights 840 to be an upper bit group of the weights 850, and determine a lower bit group of the weights 850 by quantizing the weights 820. In the example of FIG. 8, a weight value of $0111_{(2)}$ included in the weights 840 is determined based on a weight value of $01_{(2)}$ included in the weights 830, and a weight value of $01110100_{(2)}$ included in the weights 850 is determined based on the weight value of $0111_{(2)}$ included in the weights 840.

The training apparatus determines loss values respectively corresponding to the weights 830, 840, and 850, for example, $Loss_2$, $Loss_4$, and $Loss_8$ as illustrated, by applying the input data 810 to the first layer. The loss values $Loss_2$, $Loss_4$, and $Loss_8$ may correspond to outputs of the neural network by the first layer and subsequent layers of the first layer. The weights 820 are updated based on the loss values $Loss_2$, $Loss_4$, and $Loss_8$ in a backward process. When training the weights 820 is completed through such foregoing process, a source model is determined by quantizing the weights 820 for which the training is completed to the bit-widths corresponding to the weights 830 through 850. Further, the forward process described above with reference to FIG. 7 may be applied to the forward process described with reference to FIG. 8.

In the forward process described with reference to FIG. 7, bit values of lower bit-width weights may be dependent on bit values of upper bit-width weights due to bit extraction, and thus linear quantization may be performed based on the forward process described with reference to FIG. 7. In the forward process described with reference to FIG. 8, only a portion of bit values of lower bit-width weights may be extracted from bit values of upper bit-width weights and a remaining portion of the bit values of the lower bit-width weights may be determined through quantization based on the high bit-width weights. Thus, by the bit values determined through the quantization, nonlinear quantization may be performed based on the forward process described with reference to FIG. 8. Thus, bit sharing between the weights 830 through 850 in the example of FIG. 8 may be less than bit sharing between the weights 730 through 750 in the example of FIG. 7.

Figure 9:
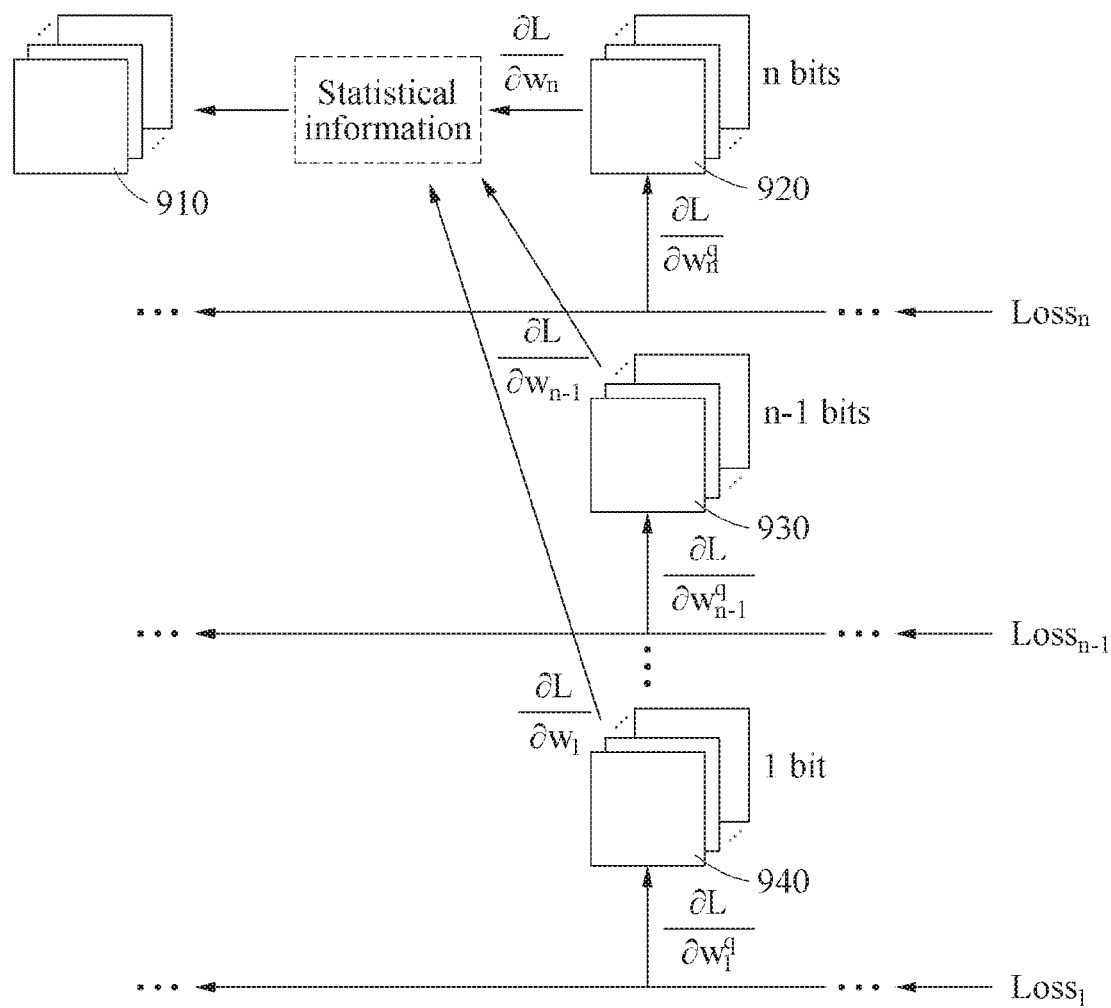
FIG. 9 is a diagram illustrating an example of a backward process for training, in accordance with one or more embodiments.

FIG. 9 is a diagram illustrating an example of a backward process for training.

In the example of FIG. 9, illustrated are high bit-width weights 910 and low bit-width weights 920 through 940. The weights 910 have a higher bit-precision than the weights 920 through 940. The weights 920 have a bit-width of n bits, the weights 930 have a bit-width of n-1 bits, and the weights 940 have a bit-width of 1 bit. In the example of FIG. 9, omitted are weights having a bit-width of 2 bits, and weights having a bit-width of n-2 bits, and the like. Although each interval between bit-widths is illustrated as 1 bit in the example of FIG. 9, intervals between bit-widths may be defined as various numbers of bits. In addition, the intervals may be identical to or different from each other. In the example of FIG. 9, the high bit-width weights 910 and the low bit-width weights 920 through 940 may correspond to a first layer of a neural network.

A training apparatus updates the weights 910 based on loss values $Loss_n$, $Loss_{n-1}$, and $Loss_1$. The training apparatus determines gradients of loss, or loss gradients herein, corresponding to the loss values $Loss_n$, $Loss_{n-1}$, and $Loss_1$, and updates the weights 910 based on statistical information of the determined loss gradients. Herein, a loss gradient may include a first loss gradient represented by $$\frac{\partial L}{\partial w_i^q}$$

and a second loss gradient represented by $$\frac{\partial L}{\partial w_i},$$

in which i denotes an integer value between 1 and n, and L, w, and $w^q$ denote a loss, a weight, and a quantized weight, respectively.

The training apparatus may update the weights 910 based on statistical information of the second loss gradient. For example, the statistical information may be an average of second loss gradients, which is represented by Equation 1 below, or a weighted average of the second loss gradients, which is represented by Equation 2 below.

$$\frac{1}{n}\sum_{i=1}^{n}\frac{\partial L}{\partial w_i} \qquad \text{Equation 1}$$

$$\frac{1}{n}\sum_{i=1}^{n}\alpha_i\frac{\partial L}{\partial w_i} \qquad \text{Equation 2}$$

In Equation 2, $\alpha$ denotes a weighted value. The training apparatus may calculate the statistical information by assigning a high weighted value to a loss gradient corresponding to a weight for which a high priority is set among the weights 920 through 940. For example, a higher weighted value may be assigned with respect to a weight with a higher bit-precision, or a higher weighted value may be assigned with respect to a weight with a lower bit-precision. Herein, a weighted value may be determined based on a result of training or a purpose of training.

When training of the weights 910 is completed through the foregoing process, a source model is determined by quantizing the weights 910 for which the training is completed to the bit-widths corresponding to the weights 920 through 940.

Figure 10:
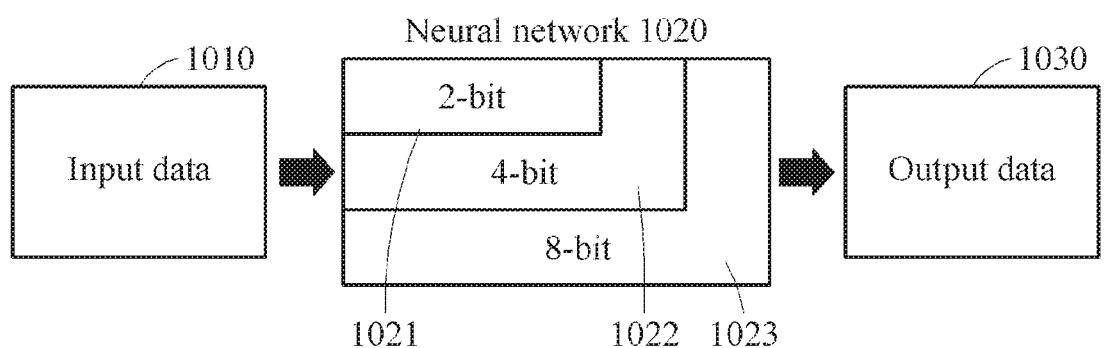
FIG. 10 is a diagram illustrating an example of use of a nested bit representation to process a single task, in accordance with one or more embodiments.

FIG. 10 is a diagram illustrating an example of us the implementation of a nested bit representation to process a single task.

Referring to FIG. 10, a neural network 1020 is executed based on weights 1021 having a bit-width of 2 bits, weights 1022 having a bit-width of 4 bits, and weights 1023 having a bit-width of 8 bits. The weights 1021 through 1023 may correspond to a nested bit model. The illustrated numbers of bits are provided merely as examples, and thus the weights 1021 through 1023 may be represented by other various numbers of bits. Although three types of bit-width are illustrated in the example of FIG. 10, the neural network 1020 may also be executed based on weights with two, or four or more types of bit-width.

The neural network 1020 generates output data 1030 by processing input data 1010. The input data 1010 may be image data or voice data. When the input data 1010 is input, the neural network 1020 selects weights corresponding to at least one bit-width from the weights 1021 through 1023 to process the input data 1010.

The neural network 1020 is executed based on weights having different bit-widths for each at least one layer. For example, a first layer of the neural network 1020 may be executed based on weights of a first bit-width, and a second layer of the neural network 1020 may be executed based on weights of a second bit-width. Alternatively, the neural network 1020 may be executed based on weights having different bit-widths for each network. For example, the neural network 1020 may be executed again based on weights of a second bit-width after being executed based on weights of a first bit-width. In this example, the neural network 1020 executed based on the weights of the first bit-width may be referred to as a first neural network, and the neural network 1020 executed based on the weights of the second bit-width may be referred to as a second neural network.

In the example of FIG. 10, the neural network 1020 processes a single task based on the weights 1021 through 1023 of various bit-widths. In this example, a bit-precision corresponding to the bit-widths of the weights 1021 through 1023 may affect an accuracy in processing the single task. For example, the output data 1030 that is generated based on the weights 1023 corresponding to a relatively high bit-width, may be more accurate than the output data 1030 generated based on the weights 1021 corresponding to a relatively lower bit-width. For example, such processing accuracy may correspond to a FAR or a VR. Thus, a bit-width may be determined based on a processing accuracy needed for a single task.

Figure 11:
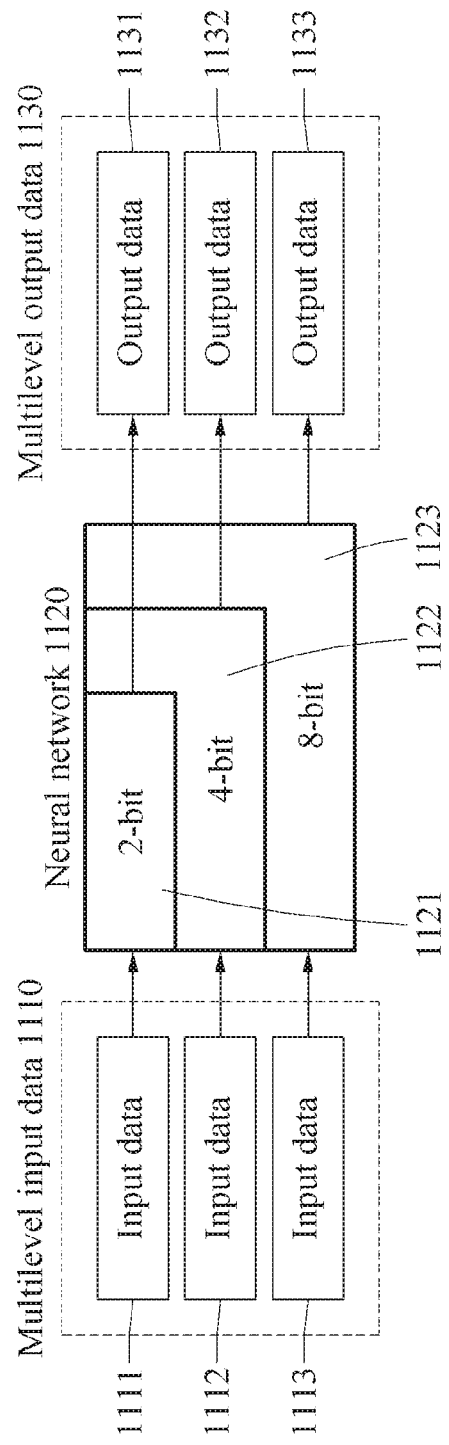
FIG. 11 is a diagram illustrating an example of use of a nested bit representation to process multiple tasks, in accordance with one or more embodiments.

FIG. 11 is a diagram illustrating an example of use of a nested bit representation to process multiple tasks.

Referring to FIG. 11, when multilevel input data 1110 is applied to a neural network 1120, the neural network 1120 processes the multilevel input data 1110 to generate multilevel output data 1130. The multilevel input data 1110 may be multilevel image data or multilevel voice data. In a non-limiting example, input data 1111 may correspond to a low-resolution image, input data 1112 may correspond to a medium-resolution image, and input data 1113 may correspond to a high-resolution image. In another non-limiting example, the input data 1111 may correspond to a low-resolution image, the input data 1112 may correspond to a high-resolution image, and the input data 1113 may correspond to a cropped image.

The neural network 1120 may be executed based on weights 1121 having a bit-width of 2 bits, weights 1122 having a bit-width of 4 bits, and weights 1123 having a bit-width of 8 bits. The weights 1121 through 1123 may be trained to perform different tasks. For example, the weights 1121 may be trained to sense a face in an image, the weights 1122 may be trained to detect a position of the face in the image, and the weights 1123 may be trained to verify the face in the image. In this example, output data 1131 may indicate whether the face is sensed, output data 1132 may indicate information about the position of the face, and output data 1133 may indicate whether the face is verified.

In another example, the weights 1121 may be trained to sense an object in an image, the weights 1122 may be trained to detect a position of the object in the image and recognize a superclass, or a coarse-grained class, of the object, and the weights 1123 may be trained to recognize a subclass, or a fine-grained class, of the object. In this example, the output data 1131 may indicate that the object is sensed, the output data 1132 may indicate information about the position of the object and the superclass of the object, and the output data 1133 may indicate the subclass of the object. The multilevel output data 1130 may be used for a subsequent task. For example, the output data 1131 generated based on the weights 1121 corresponding to a first task may be used to trigger a second task.

The weights 1121 through 1123 may correspond to a nested bit model. The weights 1121 through 1123 may include a sharing bit and an individual bit. For example, a weight $01_{(2)}$ of 2 bits and a weight $0111_{(2)}$ of 4 bits may have sharing bits of 01 and individual bits of 11. The neural network 1120 may be trained to perform multiple tasks through individual bits. For example, when the weights 1121 are trained to sense a face, the weights 1122 and the weights 1123 may be trained to detect a position of the face through individual bits.

The neural network 1120 may be executed based on weights having different bit-widths for each at least one layer, or executed based on weights having different bit-widths for each network. For example, in an example in which multiple tasks are being processed in one network, the neural network 1120 may be executed based on weights having different bit-widths for each at least one layer. In this example, a first layer group of the neural network 1120 may perform face sensing based on the weights 1121, a second layer group of the neural network 1120 may perform face position detection based on the weights 1122, and a third layer group of the neural network 1120 may perform the face position detection based on the weights 1123. In this example, each layer group may include at least one layer.

In another example, in an example in which a plurality of networks is used to process multiple tasks, the neural network 1120 may be executed based on weights having different bit-widths for each network. For example, the neural network 1120 may perform object sensing by being executed based on the weights 1121, perform object position detection and superclass recognition by being executed based on the weights 1122, and perform subclass recognition by being executed based on the weights 1123. In this example, the neural network 1120 may be referred to a first neural network, a second neural network, and a third neural network respectively corresponding to these tasks.

For a more detailed description of the neural network 1120, reference may be made to the description of the neural network 1020 provided above with reference to FIG. 10.

Figure 12:
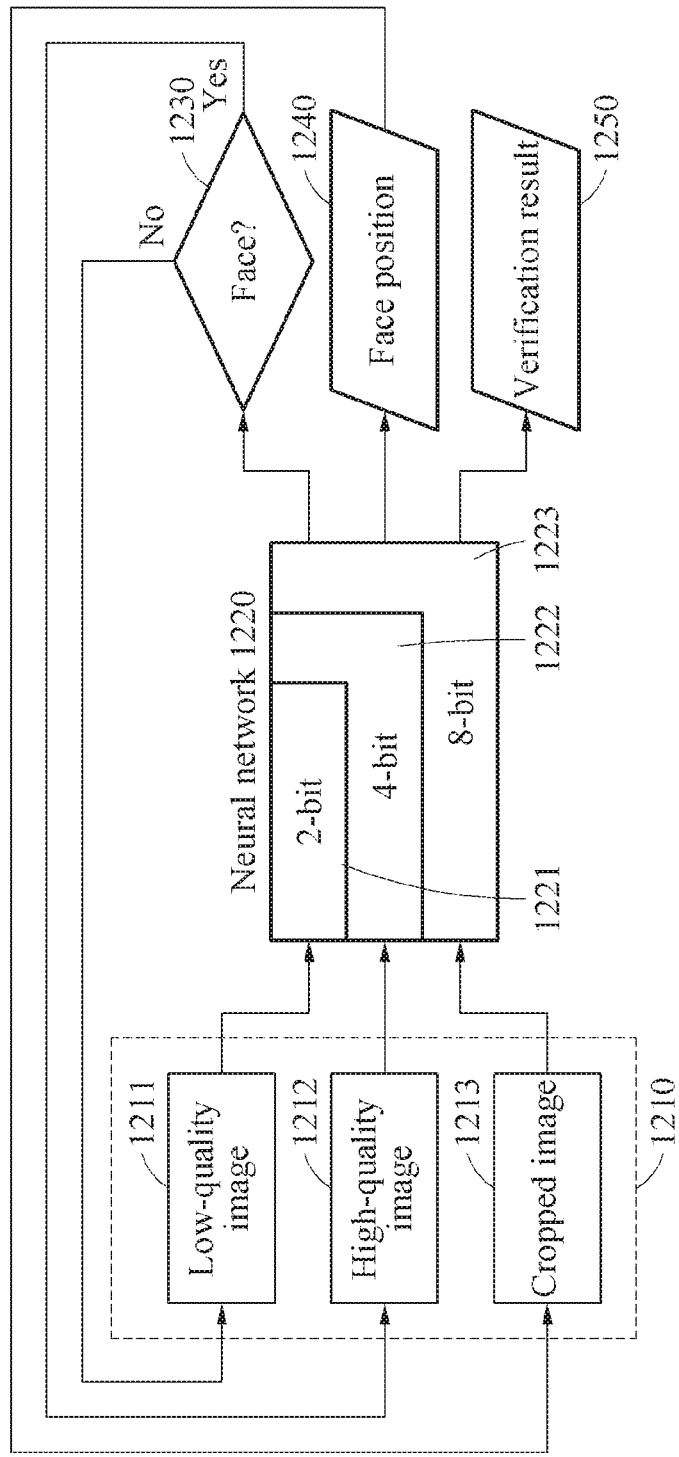
FIG. 12 is a diagram illustrating an example of a multitask process for face verification, in accordance with one or more embodiments.

FIG. 12 is a diagram illustrating an example of a multitask process for face verification.

Referring to FIG. 12, a neural network 1220 processes multilevel input data 1210. A processing apparatus executes at least one layer of the neural network 1220 based on weights 1221 having a bit-width of 2 bits. The at least one layer of the neural network 1220 executed based on the weights 1221 may output, for example, face sensing information indicating whether a face is present in a low-quality image 1211. The processing apparatus performs operation 1230 based on the output by the weights 1221. When the face is not present, the processing apparatus applies again the low-quality image 1211 to at least one layer of the neural network 1220 executed based on the weights 1221.

When the face is present, the processing apparatus executes at least one layer of the neural network 1220 based on weights 1222 having a bit-width of 4 bits, and applies a high-quality image 1212 to the at least one layer of the neural network 1220 executed based on the weights 1222. The at least one layer of the neural network 1220 executed based on the weights 1222 detects a position of the face in the high-quality image 1212 to output information indicating the position of the face in operation 1240.

The processing apparatus may generate a cropped image 1213 based on the position of the face. The processing apparatus executes at least one layer of the neural network 1220 based on weights 1223 having a bit-width of 8 bits, and applies the cropped image 1213 to the at least one layer of the neural network 1220 executed based on the weights 1223. The at least one layer of the neural network 1220 executed based on the weights 1223 may perform face verification through the cropped image 1213, and output a result of the face verification in operation 1250.

For a more detailed description of the neural network 1220, reference may be made to the description of the neural network 1020 provided above with reference to FIG. 10 and the description of the neural network 1120 provided above with reference to FIG. 11.

Figure 13:
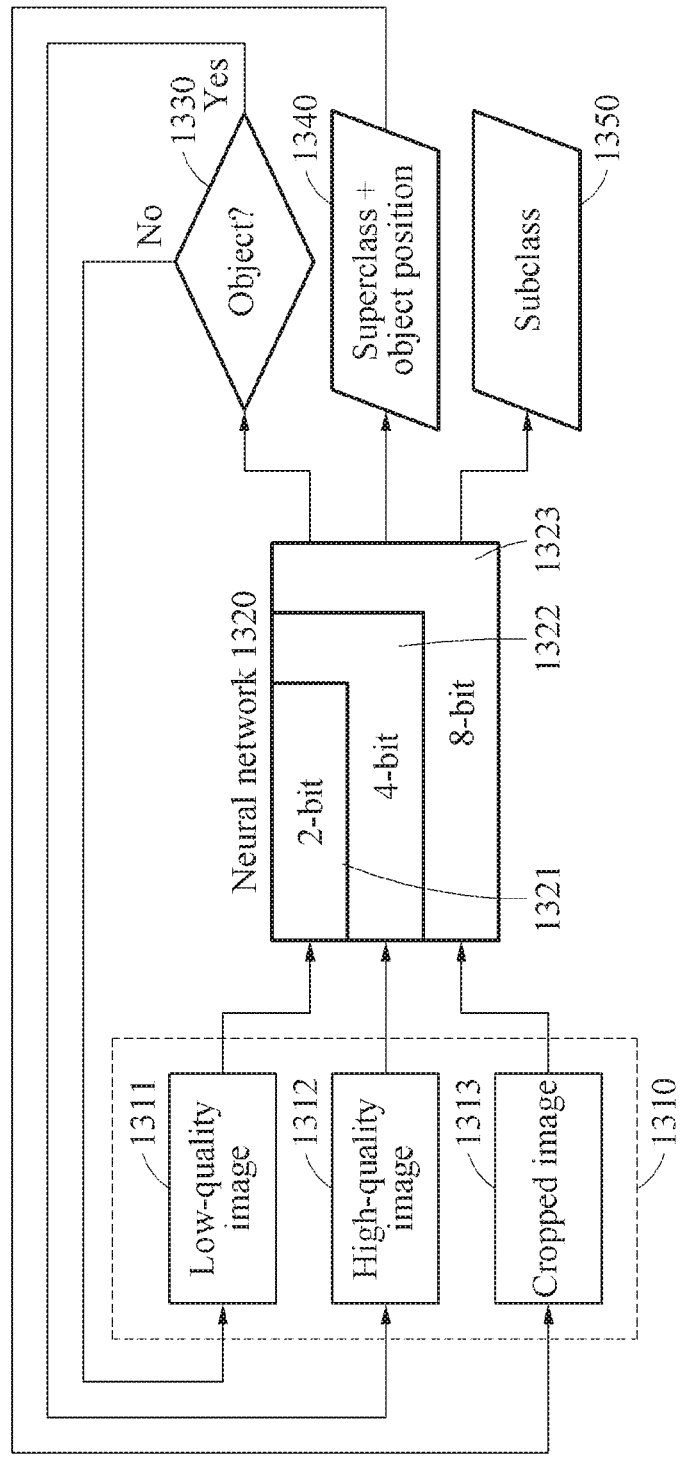
FIG. 13 is a diagram illustrating an example of a multitask process for object classification, in accordance with one or more embodiments.

FIG. 13 is a diagram illustrating an example of a multitask process for object classification. Referring to FIG. 13, multilevel input data 1310 may include a low-resolution or low-quality image 1311, a high-resolution or high-quality image 1312, and a cropped image 1313. At least one layer of a neural network 1320 executed based on weights 1321 having a bit-width of 2 bits outputs object sensing information indicating whether an object is present in the low-resolution image 1311, and whether the object is present in the low-resolution image 1311 is determined based on the object sensing information in operation 1330. At least one layer of the neural network 1320 executed based on weights 1322 having a bit-width of 4 bits detects a superclass and a position of the object from the high-resolution image 1312 and outputs information indicating the superclass and the position of the object in operation 1340. At least one layer of the neural network 1320 executed based on weights 1323 having a bit-width of 8 bits classifies the object through the cropped image 1313 and outputs information about a subclass, or a fine-grained class, of the object in operation 1350. For a more detailed description of the neural network 1320, reference may be made to the description of the neural network 1020 provided above with reference to FIG. 10, the description of the neural network 1120 provided above with reference to FIG. 11, and the description of the neural network 1220 provided above with reference to FIG. 12.

Figure 14:
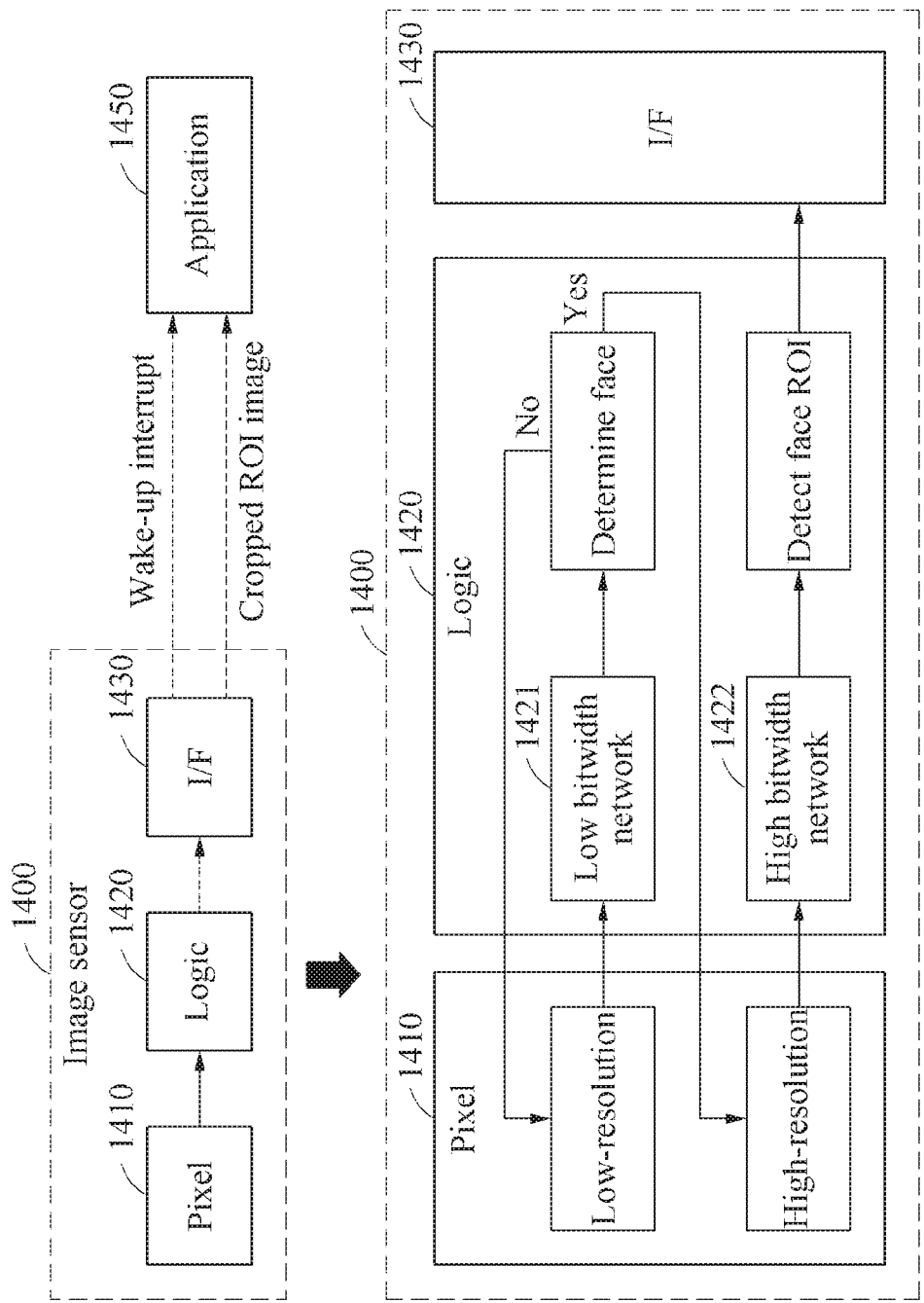
FIG. 14 is a diagram illustrating an example of an apparatus for sensing a face with low power using a multitask process, in accordance with one or more embodiments.

FIG. 14 is a diagram illustrating an example of an apparatus for sensing a face with low power using a multitask process.

Referring to FIG. 14, an image sensor 1400 includes a pixel 1410, a logic 1420, and an interface 1430. The image sensor 1400 may operate always-on, but this is only an example. To perform such always-on operation, power consumption may have to be low. Thus, the image sensor 1400 may reduce power consumption by operating in a low-resolution mode or a high-resolution mode based on whether a face is sensed with a nested bit model.

In the low-resolution mode, the pixel 1410 may activate only a portion of the pixel 1410 to generate a low-resolution image, and the logic 1420 may execute a low bit-width network 1421 based on low bit-width weights corresponding to the low-resolution mode to sense whether a face is present in the low-resolution image. For example, a low bit-width may be 2 bits or 4 bits.

When the face is present in the low-resolution image, an operation mode of the image sensor 1400 changes from the low-resolution mode to the high-resolution mode. In the high-resolution mode, the pixel 1410 activates a greater portion of the pixel 1410 than when in the low-resolution mode to generate a high-resolution image. For example, in the high-resolution mode, the pixel 1410 may activate an entire area of the pixel 1410. The logic 1420 may execute a high bit-width network 1422 based on high bit-width weights corresponding to the high-resolution mode to detect a region of interest (ROI) corresponding to the face detected in the high-resolution image. For example, a high bit-width may be 4 bits or 8 bits, but is not limited thereto.

The interface 1430 may transmit, to an application 1450, a wake-up interrupt and a cropped region-of-interest (ROI) image. The application 1450 wakes up in response to the wake-up interrupt and then performs user verification using the cropped ROI image.

The low bit-width network 1421 and the high bit-width network 1422 may be executed based on the nested bit model. The nested bit model may occupy less memory space, and thus may be run in the logic 1420 even when the logic 1420 has a memory with a low capacity and the image sensor 1400 may thus provide the low-resolution mode and the high-resolution mode. In the low-resolution mode, only a portion of the pixel 1410 may be activated and a low-resolution image with small processing capacity may be processed in the logic 1420, and thus power consumption in the low-resolution mode may be reduced. Thus, through the image sensor 1400 based on the nested bit model, face sensing and/or detection may be performed in an always-on mode with low power. Additionally, the application 1450 may be run after the face ROI is detected, and thus power consumption based on the running of the application 1450 may be minimized.

Figure 15:
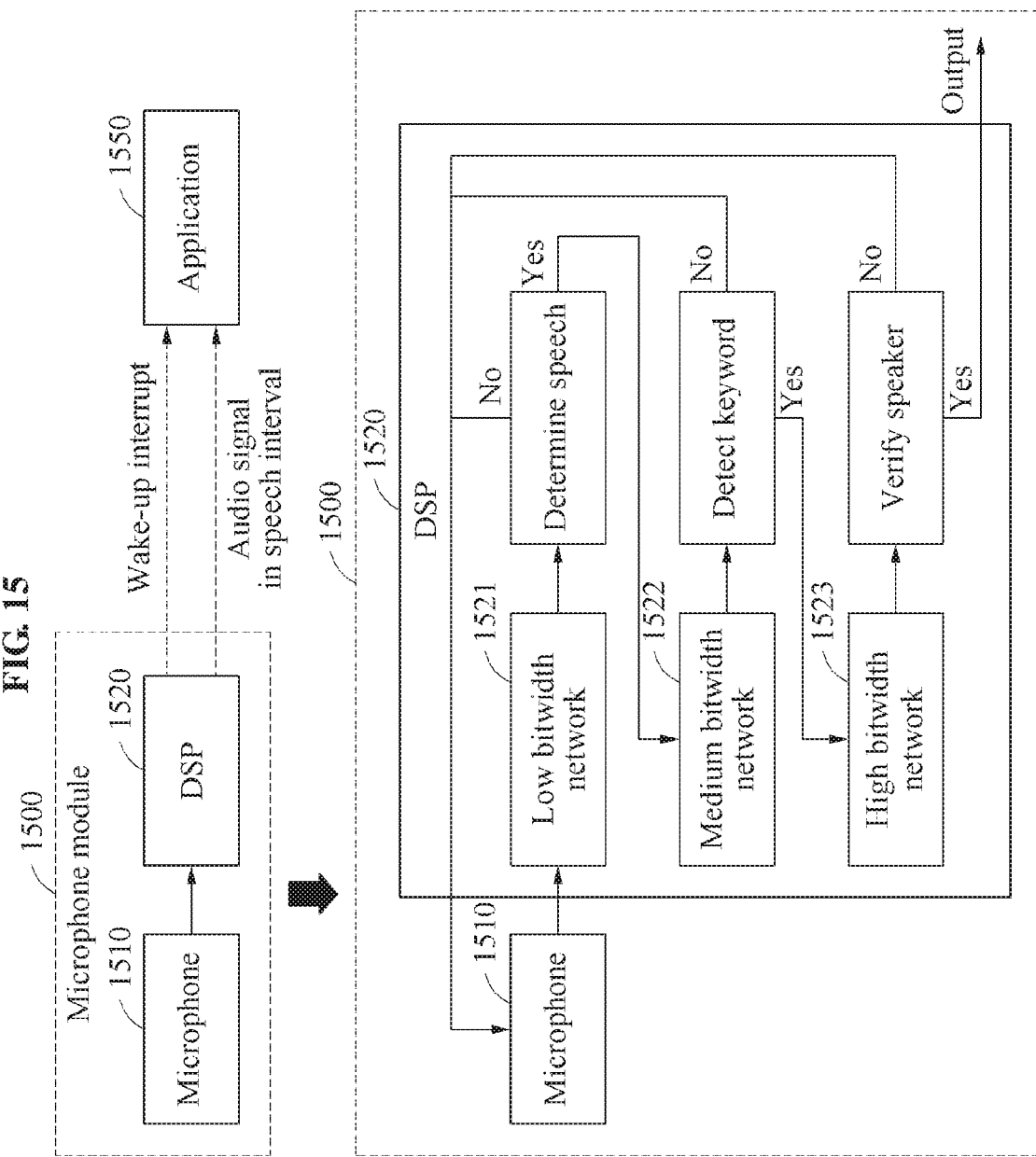
FIG. 15 is a diagram illustrating an example of an apparatus for recognizing a voice command with low power based on a multitask process, in accordance with one or more embodiments.

FIG. 15 is a diagram illustrating an example of an apparatus for recognizing a voice command with low power using a multitask process.

Referring to FIG. 15, a microphone module 1500 includes a microphone 1510 and a digital signal processor (DSP) 1520. The microphone module 1500 may operate in an always-on mode. The microphone module 1500 may reduce power consumption for such always-on operation based on a nested bit model.

The microphone 1510 outputs an audio signal in such an always-on state. The DSP 1520 executes a low bit-width network 1521 based on low bit-width weights, and determines whether the audio signal corresponds to voice or speech with the low bit-width network 1521. For example, a low bit-width may be 2 bits. When the audio signal is determined to correspond to voice or speech, the DSP 1520 executes a medium bit-width network 1522 based on medium bit-width weights. For example, a medium bit-width may be 4 bits. The DSP 1520 detects a keyword from the audio signal with the medium bit-width network 1522. The keyword may be a command to wake up an application 1550, for example, "Hi, XXX" and "Okay, XXX."

When the keyword is detected from the audio signal, the DSP 1520 executes a high bit-width network 1523 based on high bit-width weights. For example, a high bit-width may be 8 bits. The DSP 1520 verifies the identity or validity of a speaker based on the high bit-width network 1523. When the identity or validity of the speaker is verified, or when the speaker corresponds to a registered user, a wake-up interrupt and an audio signal in a speech interval are transmitted to the application 1550. The application 1550 wakes up in response to the wake-up interrupt, and then performs voice or speech recognition based on the audio signal in the speech interval.

The low bit-width network 1521, the medium bit-width network 1522, and the high bit-width network 1523 may be executed based on the nested bit model. The nested bit model may occupy less memory space, and thus may be run in the DSP 1520 even when the DSP 1520 has a memory with a low capacity. The DSP 1520 may normally operate the low bit-width network 1521, and may operate the medium bit-width network 1522 and the high bit-width network 1523 only when an audio signal corresponds to voice or speech and when a keyword is detected, in order to reduce power consumption. In addition, the application 1550 may be run after the identity of the speaker is verified, and thus power consumed by the running of the application 1550 may be minimized.

Figure 16:
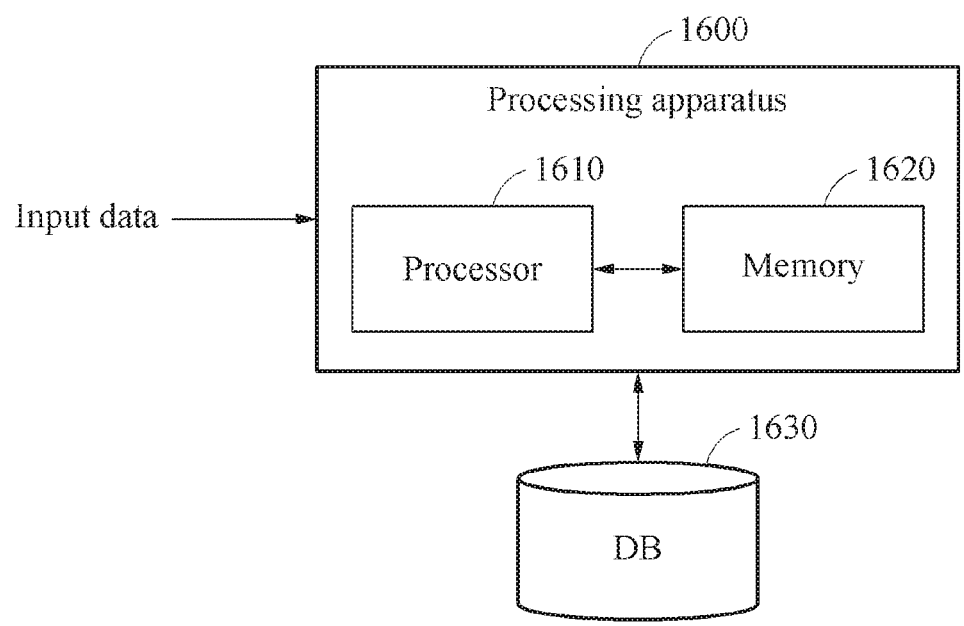
FIG. 16 is a diagram illustrating an example of a neural network processing apparatus, in accordance with one or more embodiments.

FIG. 16 is a diagram illustrating an example of a processing apparatus.

Referring to FIG. 16, a processing apparatus 1600 receives input data. The processing apparatus 1600 processes the input data with a neural network. For example, the processing apparatus 1600 may perform recognition or verification processes with respect to the input data with the neural network. A database (DB) 1630 may store a source model.

The processing apparatus 1600 may perform at least one of the operations described herein for face verification and/or recognition, and provide a user with a result of the face verification and/or recognition. In the example of FIG. 16, the processing apparatus 1600 may include one or more processors 1610 and a memory 1620. The memory 1620 may be connected to the processor 1610, and store instructions executable by the processor 1610, and data processed by the processor 1610 or data to be processed by the processor 1610. The memory 1620 may include a non-transitory computer-readable medium, for example, a high-speed random-access memory (RAM), and/or a nonvolatile computer-readable storage medium, for example, at least one disk storage device, flash memory device, and other nonvolatile solid-state memory devices.

The processor 1610 may execute instructions to perform at least one of the operations described above with reference to FIGS. 1 through 15. For example, the processor 1610 may determine a bit-width for a first layer of a neural network, obtain second weights for the first layer of the neural network by extracting at least one bit corresponding to the determined bit-width from each of first weights for a first layer of a source model corresponding to the first layer of the neural network, and process input data of the first layer of the neural network by executing the first layer of the neural network based on the obtained second weights. Alternatively, the processor 1610 may determine a bit-width for a first neural network, obtain second weights for the first neural network by extracting at least one bit corresponding to the determined bit-width from each of first weights for a source model, and process input data of the first neural network by executing the first neural network based on the obtained second weights.

Figure 17:
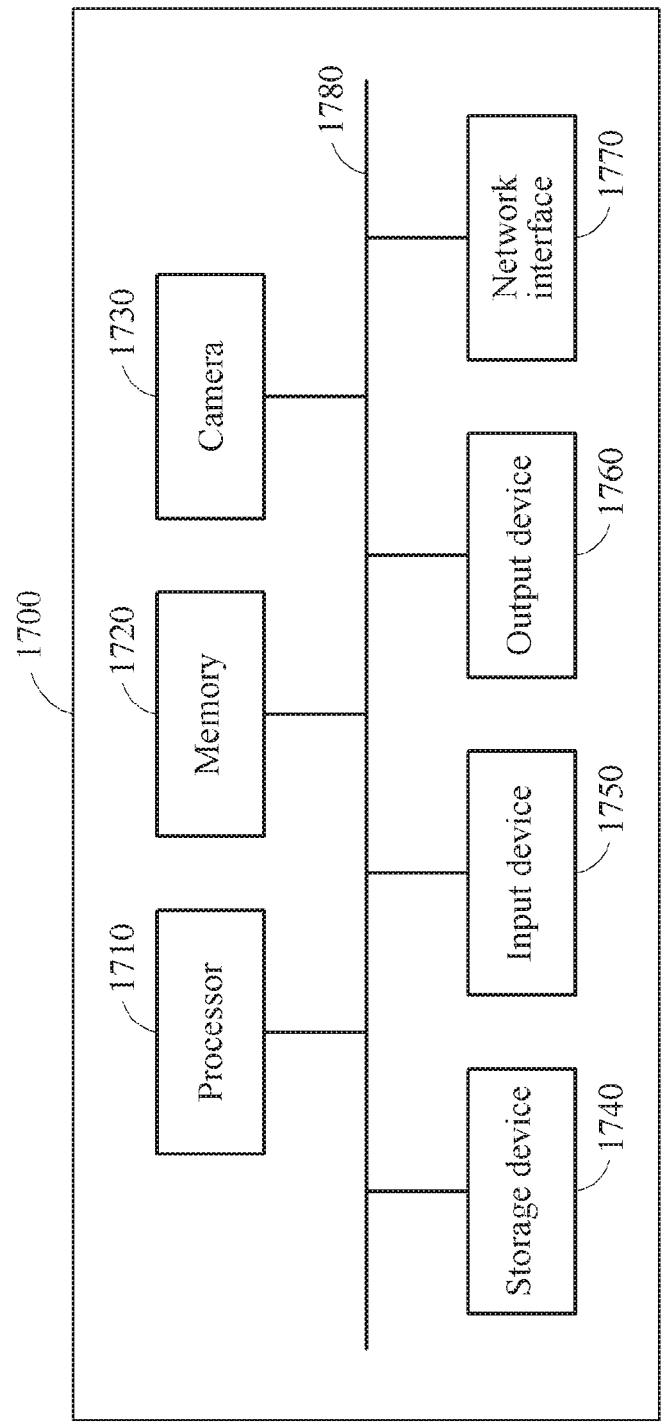
FIG. 17 is a diagram illustrating an example of an electronic apparatus, in accordance with one or more embodiments.

Though examples of FIGS. 1-16 as FIGS. 17-20 discussed below, may be discussed as computing hardware or processor(s) implementing instructions, or such computing hardware or processor(s) and one or memories that store such instructions, examples are not limited thereto. For example, such operations may also be implemented solely through computing hardware, e.g., without some or all such instructions. Regardless, references to such computing hardware being configured to perform such operations may refer to any such computing hardware or processor only implementations, computing hardware or processor implementations through execution of stored or otherwise available instructions, or computing hardware or processors in combination with stored or otherwise available instructions. FIG. 17 is a diagram illustrating an example of an electronic apparatus.

An electronic apparatus 1700 may receive an input image, and process an operation of a neural network associated with the input image. The operation of the neural network may include, for example, recognizing or verifying an object in the input image, or recognizing or verifying a voice in speech data. The electronic apparatus 1700 may use a source model described above to process the operation of the neural network. The electronic apparatus 1700 may include a processing apparatus described above with reference to FIGS. 1 through 16, or perform functions of the processing apparatus described above with reference to FIGS. 1 through 16.

Referring to FIG. 17, the electronic apparatus 1700 includes one or more processors 1710, a memory 1720, a camera 1730, a storage device 1740, an input device 1750, an output device 1760, and a network interface 1770. The processor 1710, the memory 1720, the camera 1730, the storage device 1740, the input device 1750, the output device 1760, and the network interface 1770 may communicate with one another through a communication bus 1780.

The one or more processors 1710 may execute a function and an instruction in the electronic apparatus 1700. For example, the one or more processors 1710 may process instructions stored in the memory 1720 or the storage device 1740. The one or more processors 1710 may perform at least one of the operations described above with reference to FIGS. 1 through 16. The processor 1710 may be the same one or more processors as the processor 620 of FIG. 6, and the processor 1610 of FIG. 16. The processor 1710 may be representative of one processor, as well as multiple processors, or other computing hardware. As noted above, the processor 1710 is configured to perform one or more, any combination, or all operations described with reference to FIGS. 1 through 16. For example, the processor 1710 may be configured to perform recognition or classification of input data of or derived from image(s) captured by the camera 1730. In addition, the processor 1710 is configured to control other functions of the apparatus 1700. For example, the apparatus 1700 may be a mobile device, such as a mobile phone, tablet, or personal computer, and thus the processor 1710 is further configured to implement other typical functions of the apparatus 1700. In an example, the processor 1710 may be configured to implement a lock-out operation to only permit a user to access or implement such other typical functions upon a successful verification of the user's captured face image, as discussed above.

The memory 1720 may store information to be used to process the operation of the neural network. The memory 1720 may include a computer-readable storage medium or a computer-readable storage device. The memory 1720 may be the same memory as memory 610 of FIG. 6 and/or memory 1620 of FIG. 16, though examples are not limited thereto. In addition, memory 1720 is further representative of multiple such types of memory. The memory 1720 includes, for example, a RAM, a dynamic RAM (DRAM), a static RAM (SRAM), and other types of a nonvolatile memory well-known to the technical field to which the present disclosure pertains. The memory 1720 may store instructions to be executed by the processor 1710, and store related information while a software program or an application is being executed by the electronic apparatus 1700.

The camera 1730 may capture a still image, a video image, or both the images. The camera 1730 may capture an image of a face region input by a user for face verification. The camera 1730 may also provide a three-dimensional (3D) image including depth information of objects. The processor 1710 may control the camera 1730 to obtain or capture an image, or may control the camera 1730 to autonomously capture images and automatically perform recognition on the same, for example. In addition, as noted above, the camera 1730 may also be controlled by the processor 1710 during other functions of the apparatus 1700, such as when operated as a personal camera. The camera 1730 may also be representative of plural cameras, such as a color image/video camera and a depth or infrared camera or time of flight (TOF) module, as only non-limiting examples.

The storage device 1740 may include a computer-readable storage medium or a computer-readable storage device. The storage device 1740 may store a DB including information to be used to process the neural network, such as, for example, a source model, a weight kernel, and weight values. For example, the storage device 1740 may store a greater amount of information for a longer period of time, compared to the memory 1720. The storage device 1740 may include, for example, a magnetic hard disk, an optical disc, a flash memory, a floppy disk, and other types of nonvolatile memory that are well-known in the related technical fields.

The input device 1750 may receive an input from a user through a traditional input method, for example, a keyboard and a mouse, and a new input method, for example, a touch input, a voice input, and an image input. The input device 1750 may include, for example, a keyboard, a mouse, a touchscreen, a microphone, and other devices that may detect an input from a user and transmit the detected input to the electronic apparatus 1700.

The output device 1760 may provide an output of the electronic apparatus 1700 to a user through a visual, auditory, or tactile channel. The output device 1760 may include, for example, a display, a touchscreen, a speaker, a vibration generator, and other devices that may provide an output to a user. The network interface 1770 may communicate with an external device through a wired or wireless network.

Figure 18:
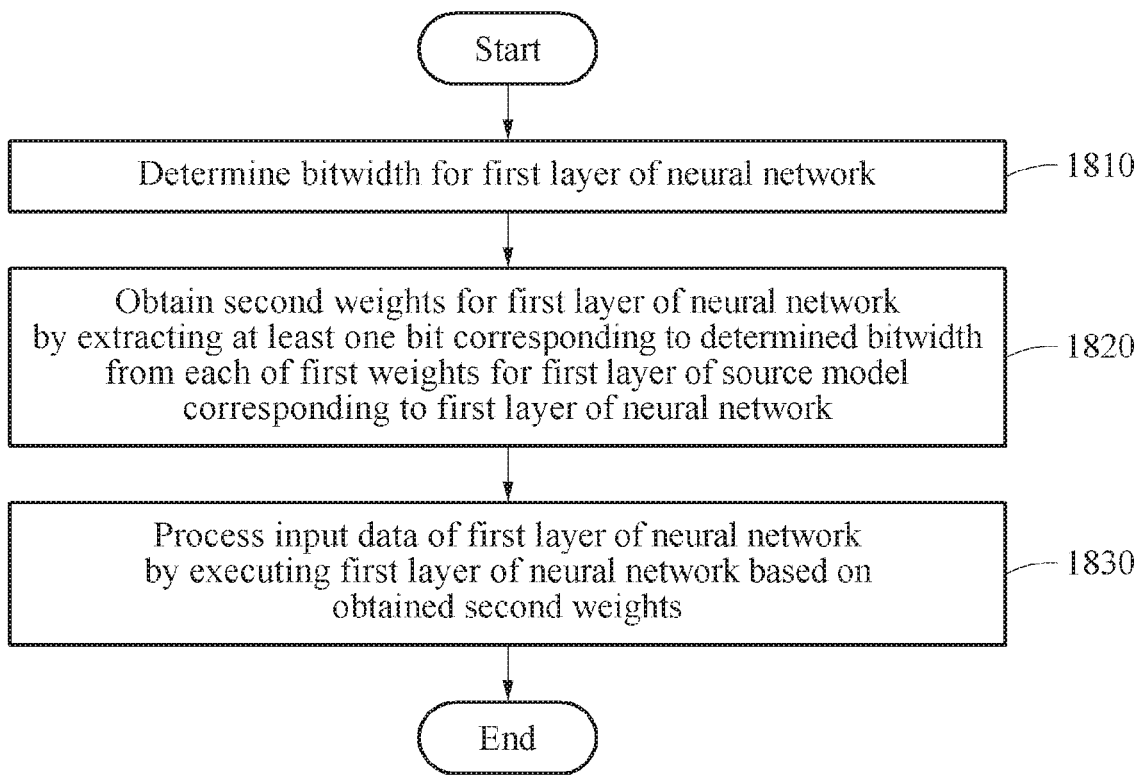
FIG. 18 is a flowchart illustrating an example of a neural network processing method, in accordance with one or more embodiments.

FIG. 18 is a flowchart illustrating an example of a neural network processing method. The operations in FIG. 18 may be performed in the sequence and manner as shown, although the order of some operations may be changed or some of the operations omitted without departing from the spirit and scope of the illustrative examples described. Many of the operations shown in FIG. 18 may be performed in parallel or concurrently. One or more blocks of FIG. 18, and combinations of the blocks, can be implemented by special purpose hardware-based computer that perform the specified functions, or combinations of special purpose hardware and computer instructions. In addition to the description of FIG. 18 below, the descriptions of FIGS. 1-17 are also applicable to FIG. 18, and are incorporated herein by reference. Thus, the above description may not be repeated here.

Referring to FIG. 18, in operation 1810, a processing apparatus determines a bit-width for a first layer of a neural network. In operation 1820, the processing apparatus obtains second weights for the first layer of the neural network by extracting at least one bit corresponding to the determined bit-width from each of first weights for a first layer of a source model corresponding to the first layer of the neural network. In operation 1830, the processing apparatus processes input data of the first layer of the neural network by executing the first layer of the neural network based on the obtained second weights. For a detailed description of the operations of the neural network processing method, reference may be made to the descriptions provided above with reference to FIGS. 1 through 17.

Figure 19:
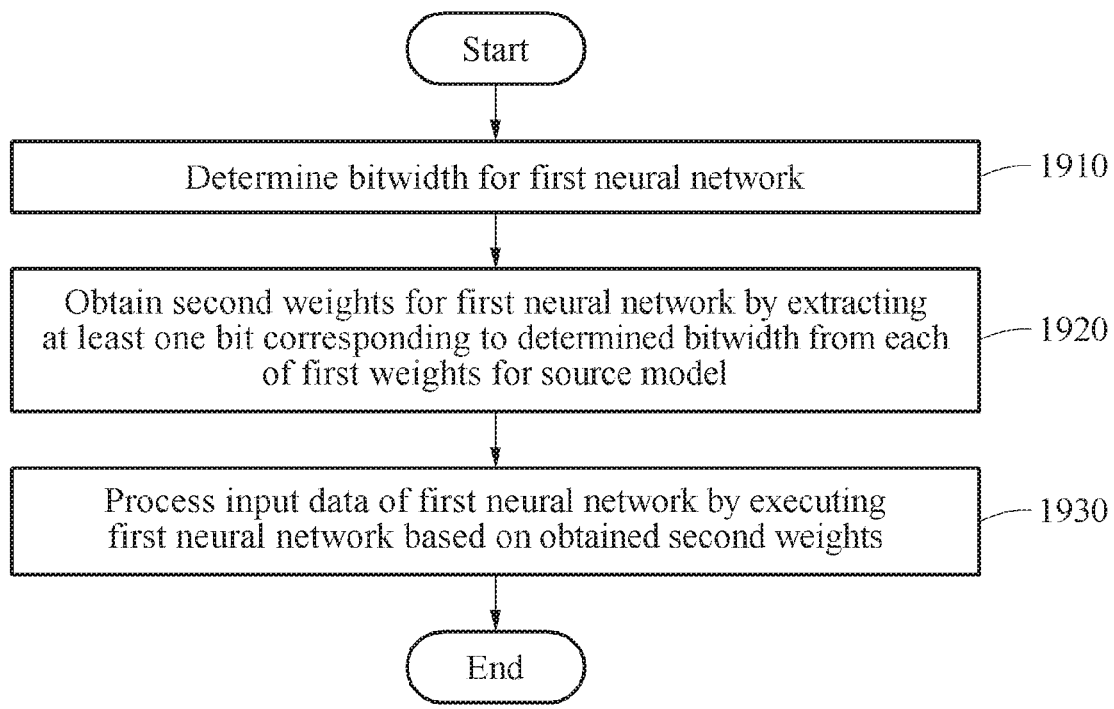
FIG. 19 is a flowchart illustrating another example of a neural network processing method, in accordance with one or more embodiments.

FIG. 19 is a flowchart illustrating another example of a neural network processing method. The operations in FIG. 19 may be performed in the sequence and manner as shown, although the order of some operations may be changed or some of the operations omitted without departing from the spirit and scope of the illustrative examples described. Many of the operations shown in FIG. 19 may be performed in parallel or concurrently. One or more blocks of FIG. 19, and combinations of the blocks, can be implemented by special purpose hardware-based computer that perform the specified functions, or combinations of special purpose hardware and computer instructions. In addition to the description of FIG. 19 below, the descriptions of FIGS. 1-18 are also applicable to FIG. 19, and are incorporated herein by reference. Thus, the above description may not be repeated here.

Referring to FIG. 19, in operation 1910, a processing apparatus determines a bit-width for a first neural network. In operation 1920, the processing apparatus obtains second weights for the first neural network by extracting at least one bit corresponding to the determined bit-width from each of first weights for a source model. In operation 1930, the processing apparatus processes input data of the first neural network by executing the first neural network based on the obtained second weights. For a detailed description of the operations of the neural network processing method, reference may be made to the descriptions provided above with reference to FIGS. 1 through 17.

Figure 20:
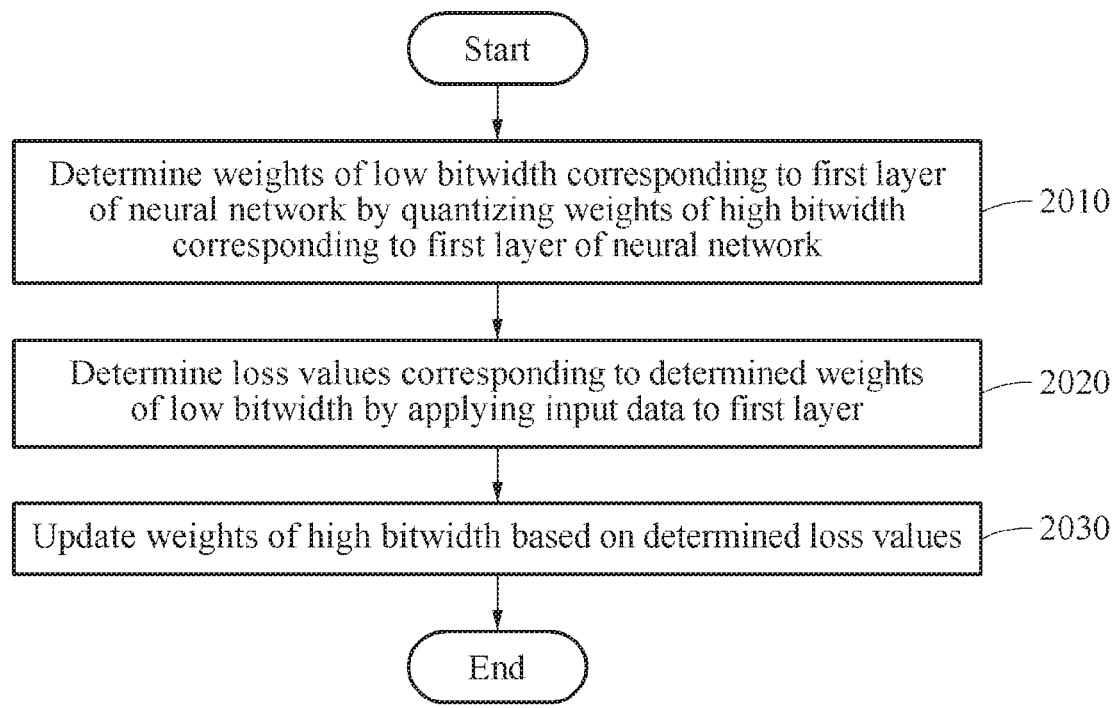
FIG. 20 is a flowchart illustrating an example of a neural network training method, in accordance with one or more embodiments.

FIG. 20 is a flowchart illustrating an example of a neural network training method. The operations in FIG. 20 may be performed in the sequence and manner as shown, although the order of some operations may be changed or some of the operations omitted without departing from the spirit and scope of the illustrative examples described. Many of the operations shown in FIG. 20 may be performed in parallel or concurrently. One or more blocks of FIG. 20, and combinations of the blocks, can be implemented by special purpose hardware-based computer that perform the specified functions, or combinations of special purpose hardware and computer instructions. In addition to the description of FIG. 20 below, the descriptions of FIGS. 1-19 are also applicable to FIG. 20, and are incorporated herein by reference. Thus, the above description may not be repeated here.

Referring to FIG. 20, in operation 2010, a training apparatus determines low bit-width weights corresponding to a first layer of a neural network by quantizing high bit-width weights corresponding to the first layer of the neural network. In operation 2020, the training apparatus determines loss values corresponding to the determined low bit-width weights by applying input data to the first layer. In operation 2030, the training apparatus updates the high bit-width weights based on the determined loss values. For a detailed description of the operations of the neural network training method, reference may be made to the descriptions provided above with reference to FIGS. 1 through 17.

The processing apparatus 100, the training apparatus 600, and other apparatuses, memories 610, 1620, and 1720, processors, 620, 1610, and 1710, image sensor 1400, microphone module 1500 camera 1720, storage device 1740, input device 1750, output device 1760, network interface 1770, devices, and other components described herein with respect to FIGS. 1, 6, 16, and 17 are, and are implemented by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-20 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations performed by the hardware components and the methods as described above. In one example, the instructions or software include machine code that is directly executed by one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res as non-limiting, blue-ray or optical disk storage examples, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented training method, comprising:
executing an iterative process, by one or more processors, with training data and an in-training first neural network, configured to perform a first task, to generate a trained first neural network, configured to perform the first task and a second task different from the first task, that has a trained first layer including trained first weights that each have a first bit-width corresponding to a first precision, the iterative process including:
quantizing in-training first weights, having the first bit-width of an in-training first layer of the in-training first neural network to generate second weights of a first layer of a second neural network, that have a second bit-width that is less than the first bit-width;
executing the second neural network using the second weights, including applying the training data to the first layer of the second neural network and determining loss values, corresponding to the second task, of the first layer of the second neural network;
updating the in-training first weights of the in-training first layer of the in-training first neural network based on the determined loss values; and
performing, for each of the updated in-training first weights, a quantization of a corresponding updated in-training first weight of the updated in-training first weights to generate a corresponding first weight of the trained first weights that includes a nested second weight having the second bit-width that shares bits with the corresponding first weight,
wherein the updating of the in-training first weights comprises updating the in-training first weights of the first bit-width based on statistical information of loss gradients corresponding to the determined loss values,
wherein the updating of the in-training first weights further comprises calculating the statistical information by assigning a high weighted value to a loss gradient corresponding to a weight for which a high priority is set among the second weights of the second bit-width, and
wherein the nested second weight is nested in the corresponding first weight and stored in a same memory space.

2. The method of claim 1, wherein the executing further includes executing the in-training first neural network using the in-training first weights, including applying the training data to the first layer of the in-training first neural network and determining other loss values, corresponding to the first task, of the first layer of the in-training first neural network, and
wherein the updating of the in-training first weights is further based on the determined other loss values.

3. The method of claim 1, wherein the quantizing of the in-training first weights includes extracting less that all bits from each of the in-training first weights to generate the second weights.

4. The method of claim 1, wherein the quantizing of the in-training first weights includes:
determining, for each of the in-training first weights, a corresponding second weight of the second weights to be a corresponding bit group of bits of the second bit-width, included in a corresponding in-training first weight of the in-training first weights, that have lower significance than at least one other bit of the corresponding in-training first weight.

5. The method of claim 2, wherein the updating of the in-training first weights comprises:
updating the in-training first weights based on respective statistical information of respective loss gradients corresponding to the determined loss values and the determined other loss values.

6. A processor-implemented training method, comprising:
executing an iterative process, by one or more processors, with training data to generate a first neural network, with first layer higher bit-width weights, using lower-precision weights corresponding to an other neural network that are nested within the higher bit-width weights, including:
quantizing weights of a high bit-width, corresponding to a first layer of the first neural network, to generate weights of a low bit-width corresponding to a first layer of the other neural network;
executing the other neural network, including applying the training data to the first layer of the other neural network and determining loss values of the first layer of the other neural network corresponding to the weights of the low bit-width; and
updating the weights of the high bit-width of the first neural network based on the determined loss values,
wherein the updating of the weights of the high bit-width comprises updating the weights of the high bit-width based on statistical information of loss gradients corresponding to the determined loss values,
wherein the updating of the weights of the high bit-width further comprises calculating the statistical information by assigning a high weighted value to a loss gradient corresponding to a weight for which a high priority is set among the weights of the low bit-width, and
wherein the weights of the low bit-width are nested in corresponding higher bit-width and stored in a same memory space.

7. A neural network training apparatus, comprising:
one or more processors configured to execute instructions; and
a memory storing the instructions, that when executed by the one or more processors configure the one or more processors to:
execute an iterative process with training data and an in-training first neural network, configured to perform a first task, to generate a trained first neural network, configured to perform the first task and a second task different from the first task, that has a trained first layer including trained first weights that each have a first bit-width corresponding to a first precision, the iterative including:
a quantizing of in-training first weights, having the first bit-width of an in-training first layer of the in-training first neural network to generate second weights of a first layer of a second neural network, that have a second bit-width that is less than the first bit-width;
an executing of the second neural network using the second weights, including applying the training data to the first layer of the second neural network and determining loss values of the first layer of the second neural network; and
an updating of the in-training first weights of the in-training first layer of the in-training first neural network based on the determined loss values;

a performance, for each of the updated in-training first weights, a quantization of a corresponding updated in-training first weight of the updated in-training first weights to generate a corresponding first weight of the trained first weights that includes a nested second weight having the second bit-width that shares bits with the corresponding first weight, wherein the updating of the in-training first weights comprises updating the in-training first weights of the first bit-width based on statistical information of loss gradients corresponding to the determined loss values, wherein the updating of the in-training first weights further comprises calculating the statistical information by assigning a high weighted value to a loss gradient corresponding to a weight for which a high priority is set among the second weights of the second bit-width, wherein the nested second weight is nested in the corresponding first weight and stored in a same memory space.

8. The training apparatus of claim 7, wherein the quantizing of the in-training first weights includes extracting less that all bits from each of the in-training first weights to generate the second weights.

9. The training apparatus of claim 7, wherein the quantizing of the in-training first weights includes determining, for each of the in-training first weights, a corresponding second weight of the second weights to be a corresponding bit group of bits of the second bit-width, included in a corresponding in-training first weight of the in-training first weights, that have lower significance than at least one other bit of the corresponding in-training first weight.

* * * * *